(12) United States Patent
Mantin et al.

(10) Patent No.: US 8,437,470 B2
(45) Date of Patent: May 7, 2013

(54) METHOD AND SYSTEM FOR BLOCK CIPHER ENCRYPTION

(75) Inventors: Itsik Mantin, Shoham (IL); Erez Waisbard, Or-Yehuda (IL); Aviad Kipnis, Efrat (IL); Aharon Grabovsky, Moshav Nerya (IL)

(73) Assignee: NDS Limited, Staines, Middlesex (GB)

( * ) Notice: Subject to any disclaimer, the term of this patent is extended or adjusted under 35 U.S.C. 154(b) by 832 days.

(21) Appl. No.: 11/992,983

(22) PCT Filed: Oct. 5, 2006

(86) PCT No.: PCT/IL2006/001167
§ 371 (c)(1),
(2), (4) Date: May 9, 2008

(87) PCT Pub. No.: WO2007/043045
PCT Pub. Date: Apr. 19, 2007

(65) Prior Publication Data
US 2009/0052656 A1 Feb. 26, 2009

(30) Foreign Application Priority Data

| Oct. 10, 2005 | (IL) | 171353 |
| Jan. 2, 2006 | (IL) | 172948 |
| Mar. 6, 2006 | (IL) | 174141 |
| Apr. 5, 2006 | (IL) | 174810 |

(51) Int. Cl.
*H04K 1/00* (2006.01)
*H04L 9/00* (2006.01)
*H04L 9/28* (2006.01)

(52) U.S. Cl.
USPC .................................. 380/28; 380/29

(58) Field of Classification Search .............. 380/28–30
See application file for complete search history.

(56) References Cited

U.S. PATENT DOCUMENTS

| 5,317,638 A | * | 5/1994 | Kao et al. ................... 380/29 |
| 5,623,549 A | * | 4/1997 | Ritter ......................... 380/37 |
| 6,769,063 B1 | * | 7/2004 | Kanda et al. ............... 713/193 |
| 2005/0058285 A1 | | 3/2005 | Stein et al. |

FOREIGN PATENT DOCUMENTS

EP  1 133 100 A2  9/2001

OTHER PUBLICATIONS

R. Anderson et al, "Serpent: A Flexible Block Cipher With Maximum Assurance", 1998, pp. 1-10.*

Jul. 23, 2008 Notification of Transmittal of International Search Report and Written Opinion of the International Searching Authority in connection with PCT/IB2007/054592.

(Continued)

*Primary Examiner* — Matthew Henning
*Assistant Examiner* — Daniel Potratz
(74) *Attorney, Agent, or Firm* — Husch Blackwell LLP

(57) ABSTRACT

A method of encrypting a block of data, is described, the method including providing a combining unit operative to combine a key with a block of data, the block of data expressed as a block of bits, providing a mix and condense unit operative to mix bits included in the block of bits among themselves, receiving an input including the block of data expressed as the block of bits, combining, at the combining unit, the block of bits with a key, and mixing, at the mixing and condensing unit, the combined block of bits, wherein the mix and condense unit includes a plurality of layers, each layer among the plurality of layers including a plurality of mini-functions. Related apparatus and methods are described.

20 Claims, 21 Drawing Sheets

OTHER PUBLICATIONS

A. Menezes et al., Handbook of Applied Cryptography, ch. 7, pp. 223-282 (CRC Press 1996).

Transmittal of International Preliminary Report on Patentability (11 pages).

"Announcing the Advanced Encryption Standard (AES)" (Federal Information Processing Standards Publication 197, Nov. 26, 2001).

Mar. 31, 2011 Office Communication in connection with prosecution of EP 06 796 158.1.

Jul. 10, 2012 Office Communication in connection with prosecution of AU 2006 300744.

Ross Anderson et al., "Serpent: A Flexible Block Cipher with Maximum Assurance" (The First Advanced Encryption Standard Candidate Conference, Proceedings, Ventura, California, Aug. 1998, pp. 1-10).

Ross Anderson et al., "Serpent: A proposal for the Advanced Encryption Standard.", 1998.

Pascal Junod et al., "Fox: A New Family of Block Ciphers," *Selected Areas in Cryptography 2004*: Waterloo, Canada (Aug. 9-10, 2004).

Lars H. Knudsen, "Practically Secure Feistel Ciphers" (in Lecture Notes in Computer Science 809, Ross Anderson, Ed., Springer-Verlag, pp. 211-221, 1994).

Michael Luby et al., "How to Construct Pseudorandom Permutations From Pseudorandom Functions," *SIAM Journal on Computing*, 17:2, pp. 373-386 (Apr. 1988).

Mitsuru Matsui, "New Block Encryption Algorithm MISTY" (Proceedings of Fast Software Encryption Workshop 1997, p. 54-68).

M. Matsui et al., "A Description of the MISTY1 Encryption Algorithm" (Network Working Group, RFC 2994), (The Internet Society, Nov. 2000).

Moni Naor et al., "On the Construction of Psuedo-Random Permutations: Luby-Rackoff Revisted.", 1997.

A. Menezes, et al., *The Handbook of Applied Cryptography* (CRC Press, 1996, pp. 250-259 and 276-278).

Bruce Schneier, *Applied Cryptography, Second Edition, Protocols, Algorithms, and Sourcecode in C*, p. 347-351 (John Wiley and Sons, Inc., 1996).

Bruce Schneier et al., "Twofish: A 128-Bit Block Cipher" (in First Advanced Encryption Standard (AES) Conference, Ventura, California, USA, Jun. 15, 1998, pp. 1-68).

Bruce Schneier et al., "Unbalanced Feistel Networks and Block-Cipher Design" (Counterpane Systems)., 1996.

Data Encryption Standard (DES) FIPS PUB 46-3 (US Dept of Commerce, National Institute of Standards and Technology, Oct. 25, 1999).

Feistel cipher (Mar. 20, 2008) from Wikipedia.

\* cited by examiner

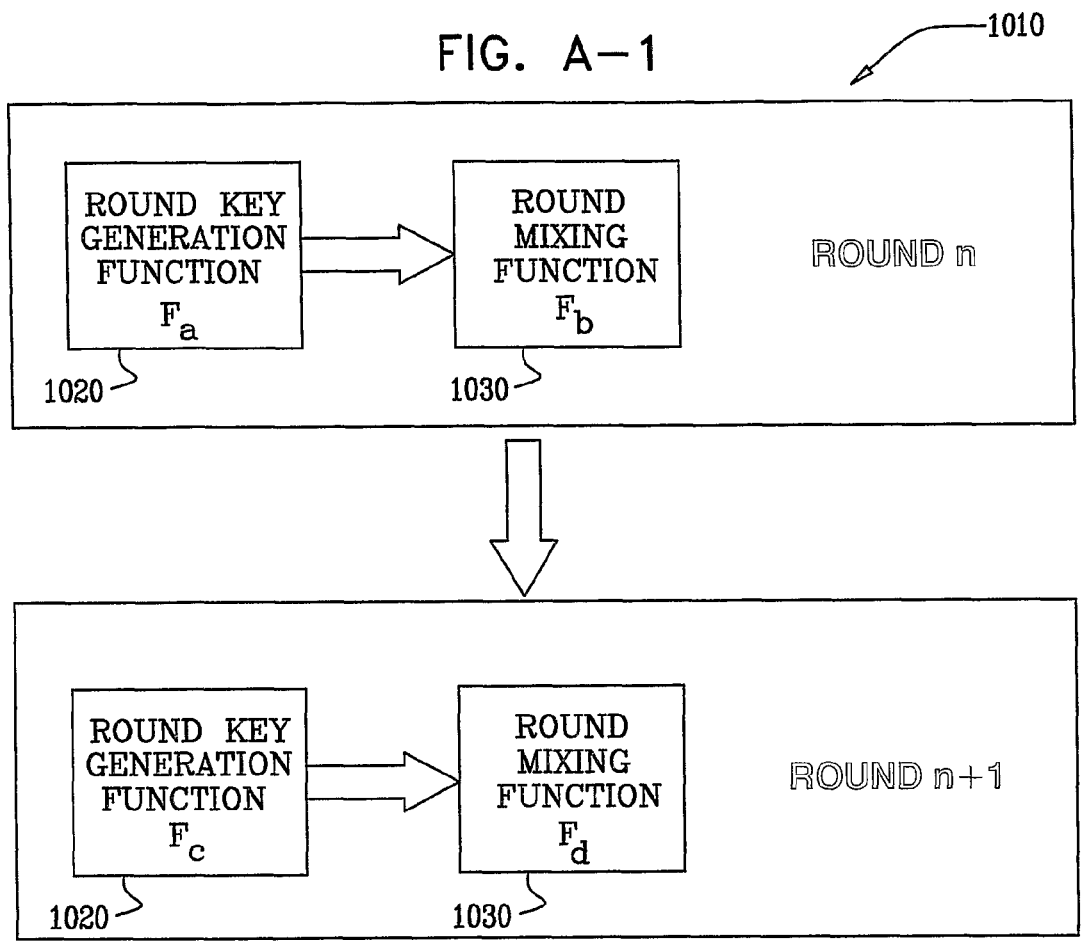

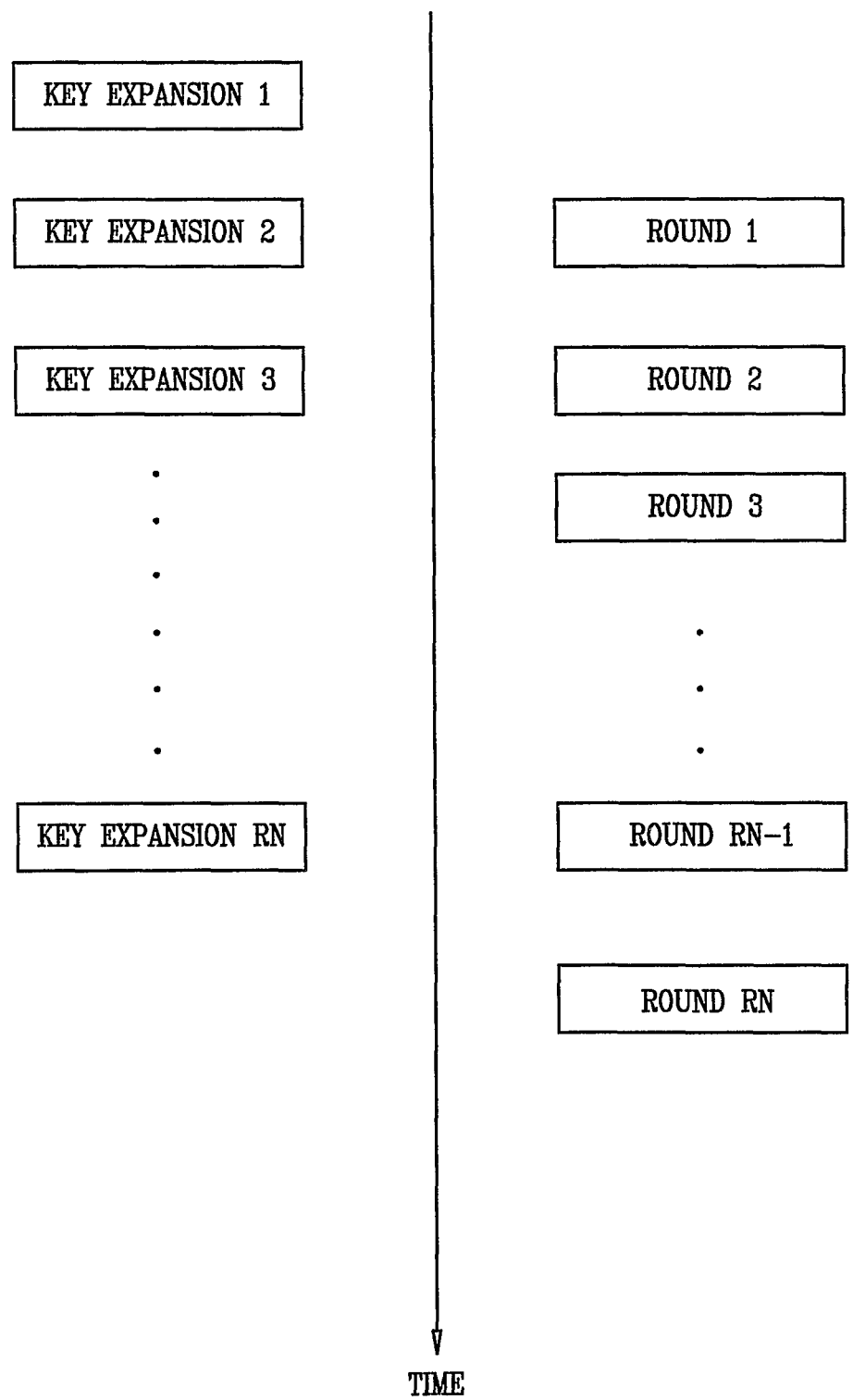
FIG. A-2

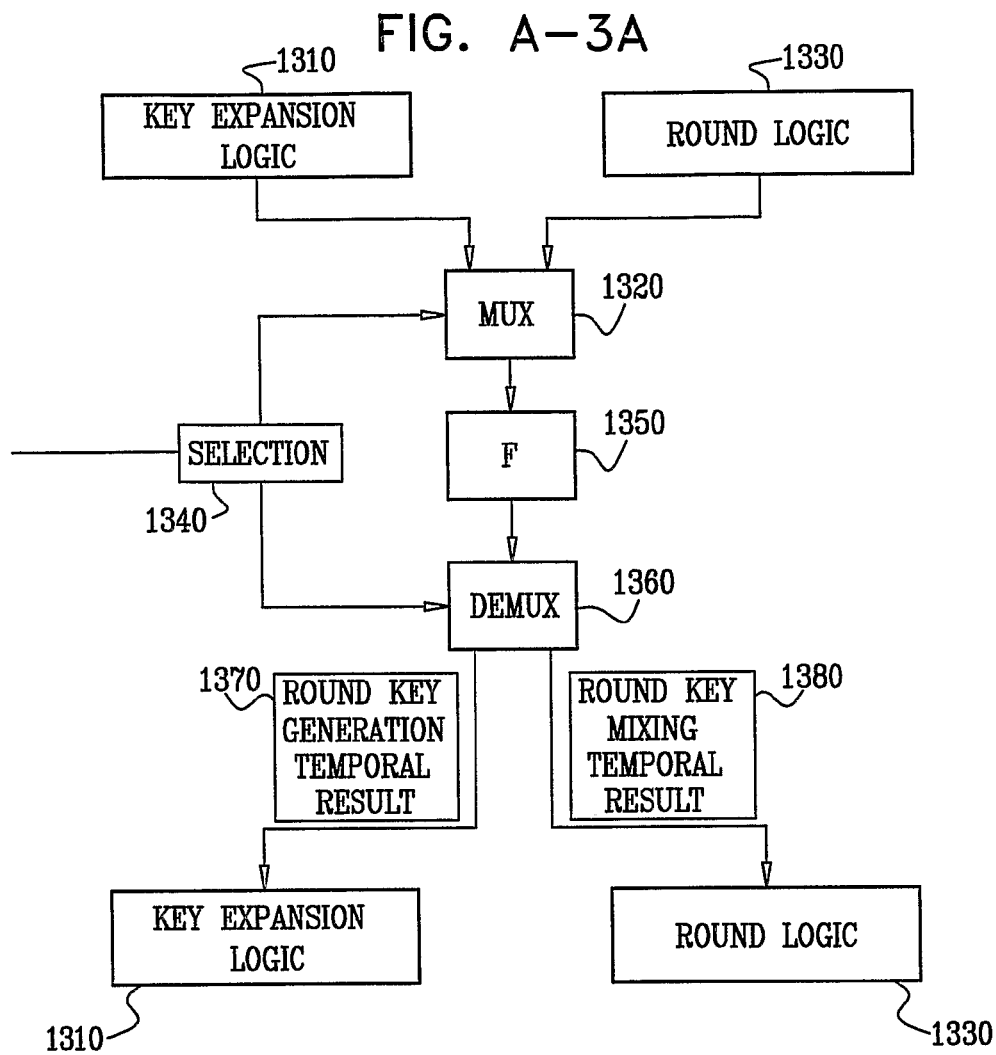
FIG. A-3A
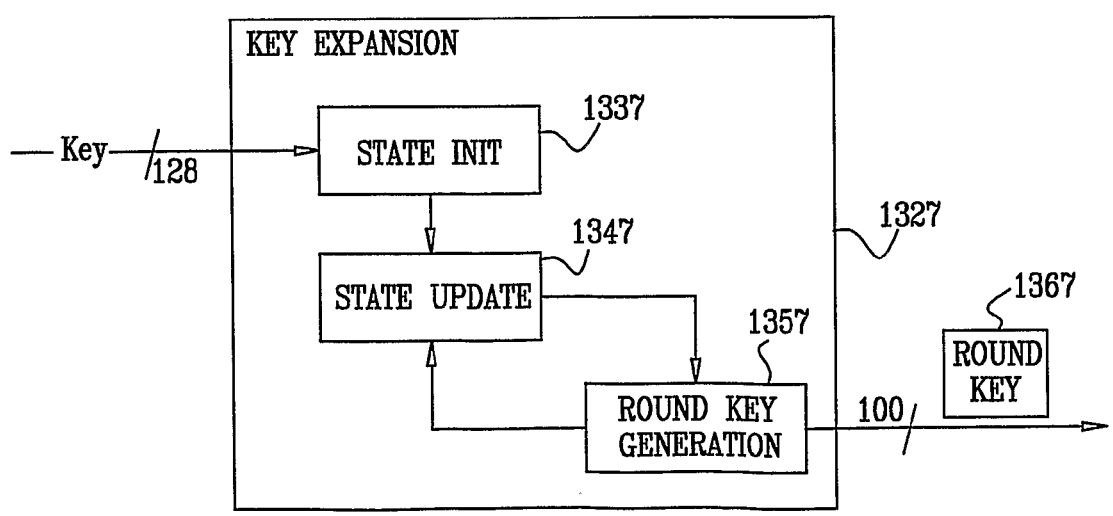
FIG. A-3B

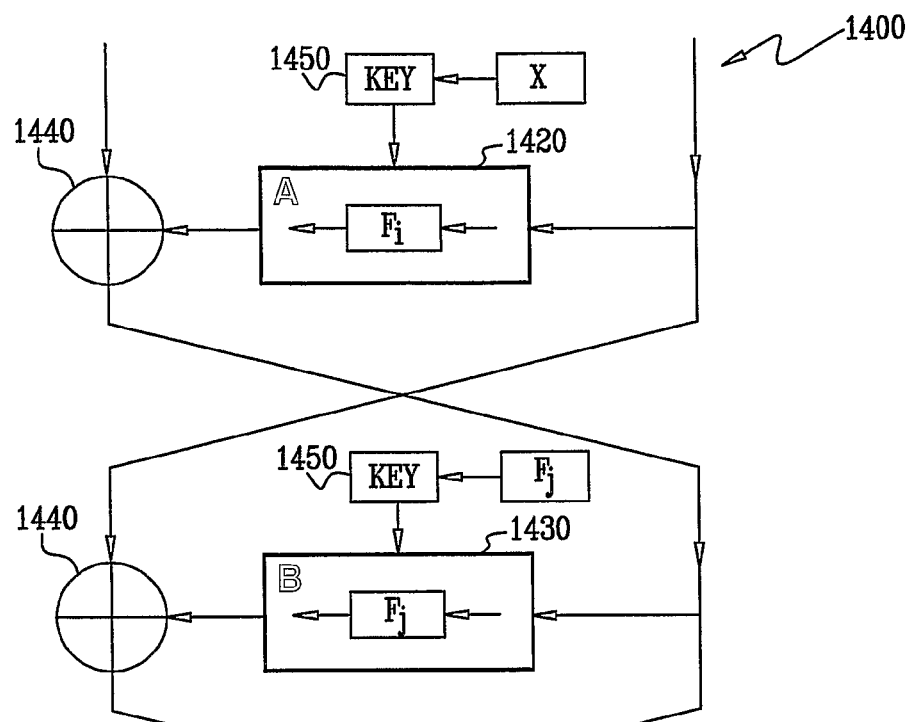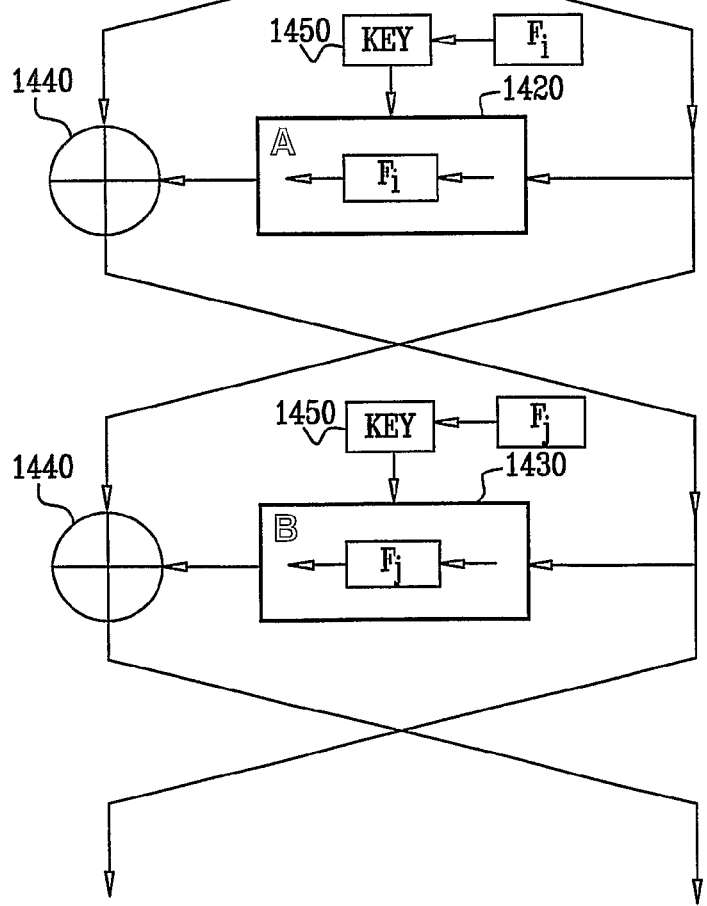
FIG. A-4

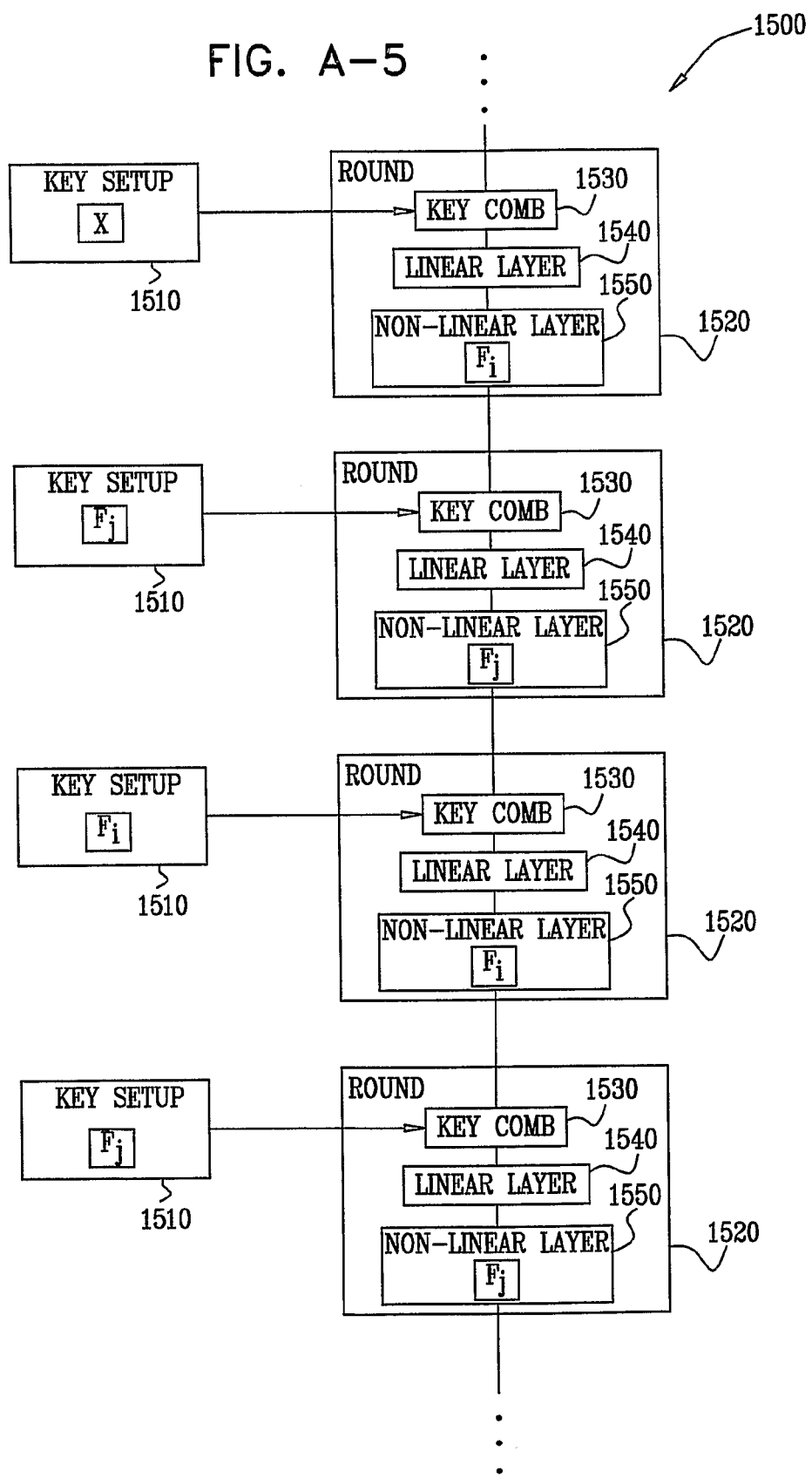
FIG. A-5

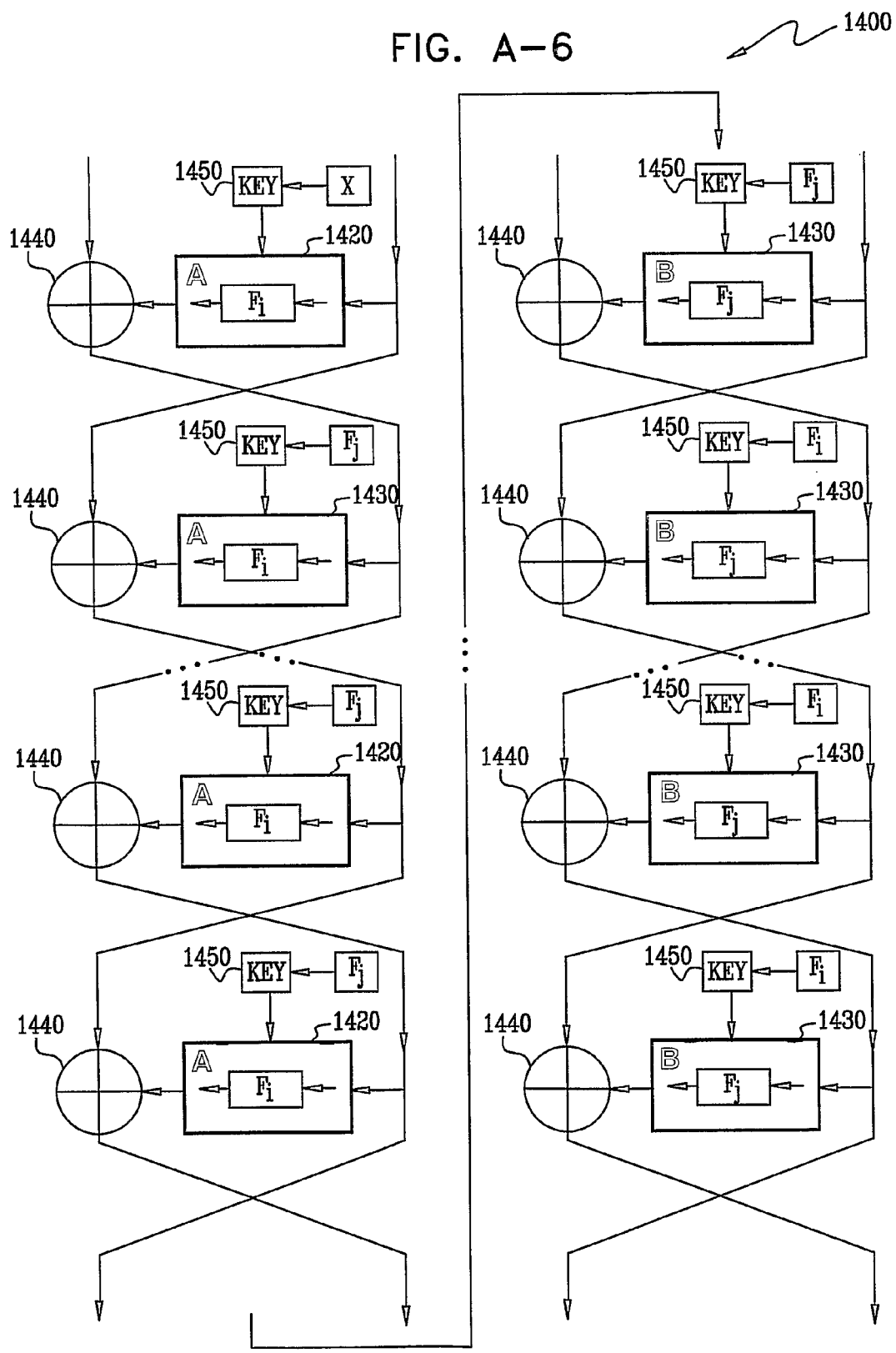
FIG. A-6

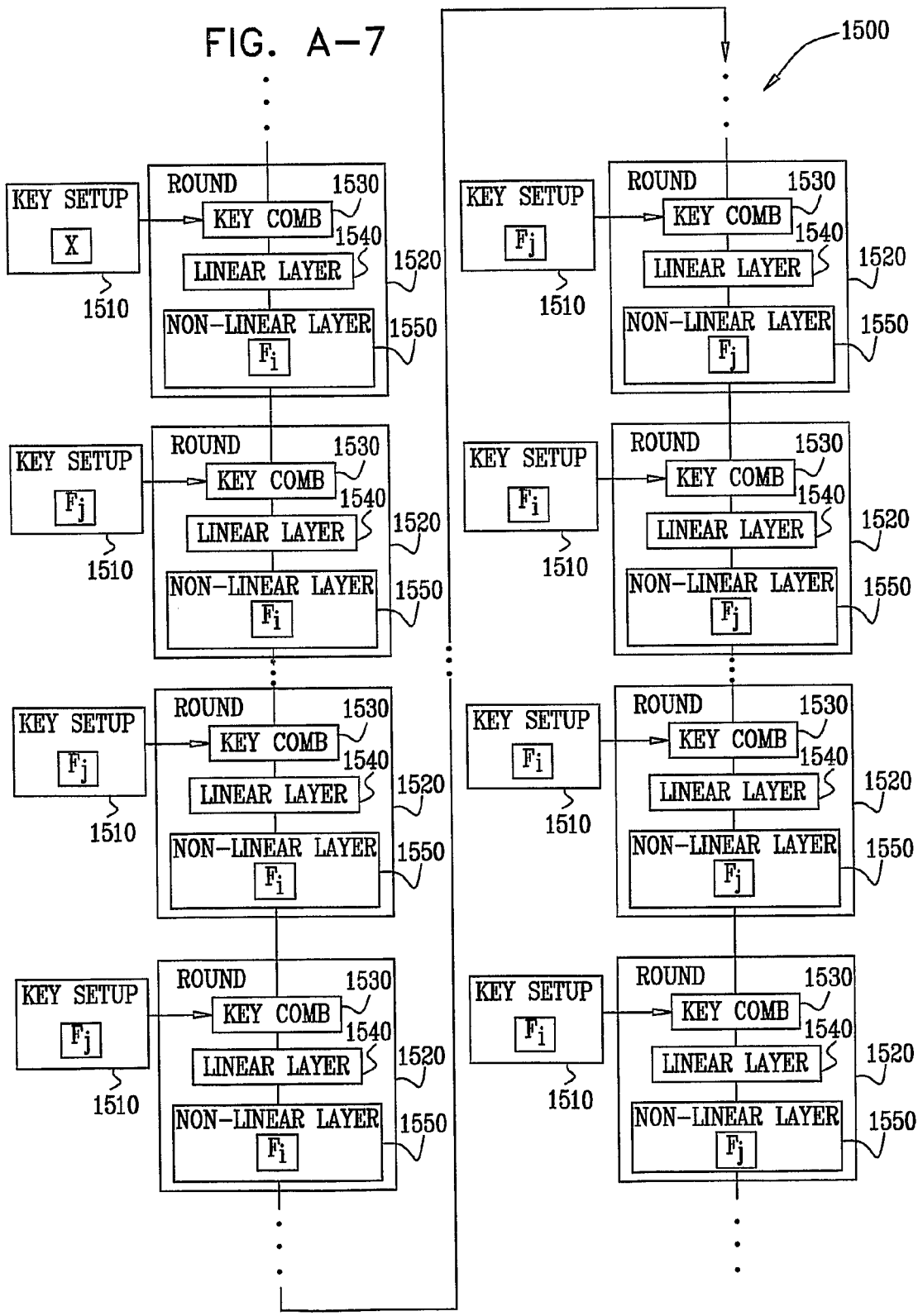
FIG. A-7

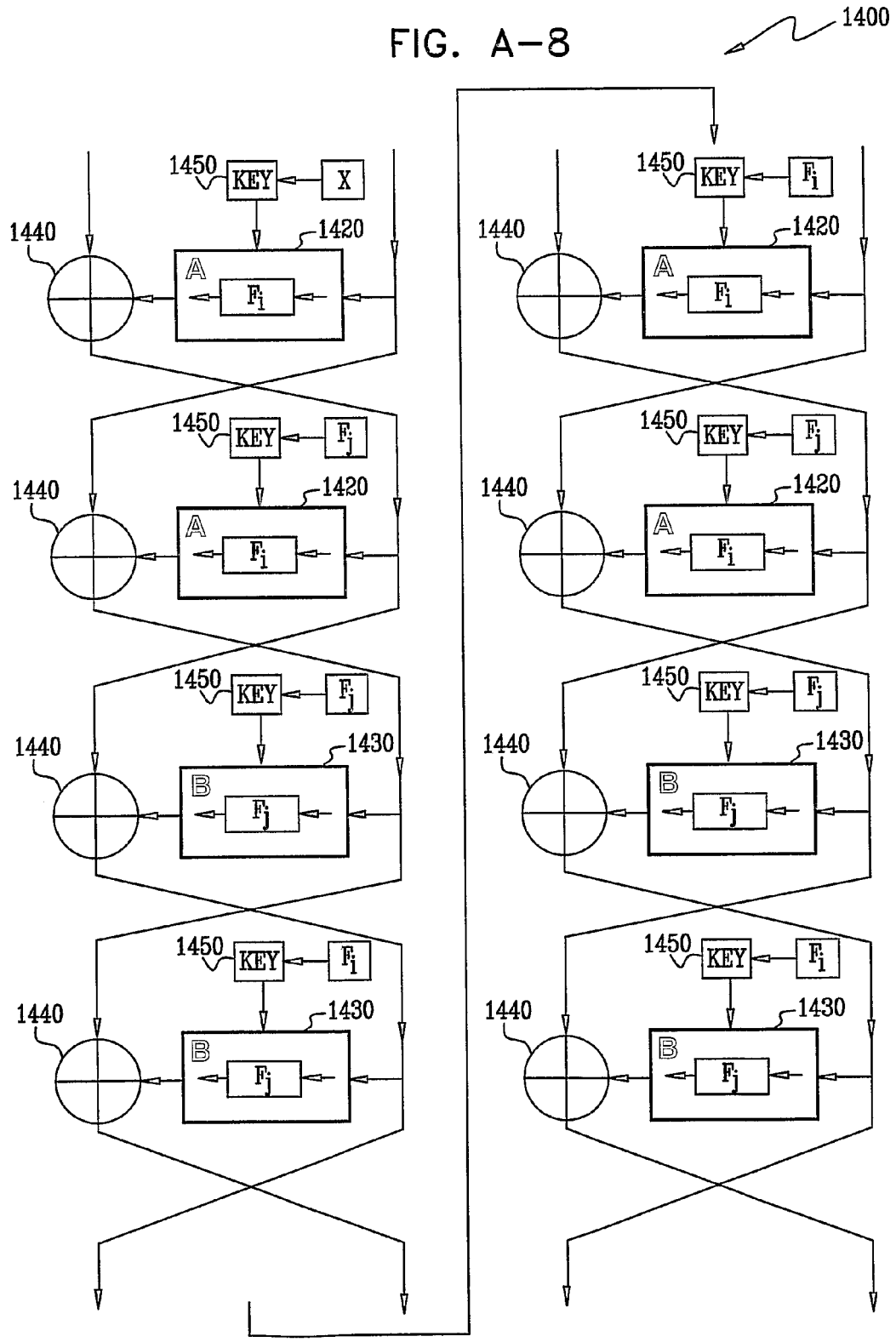

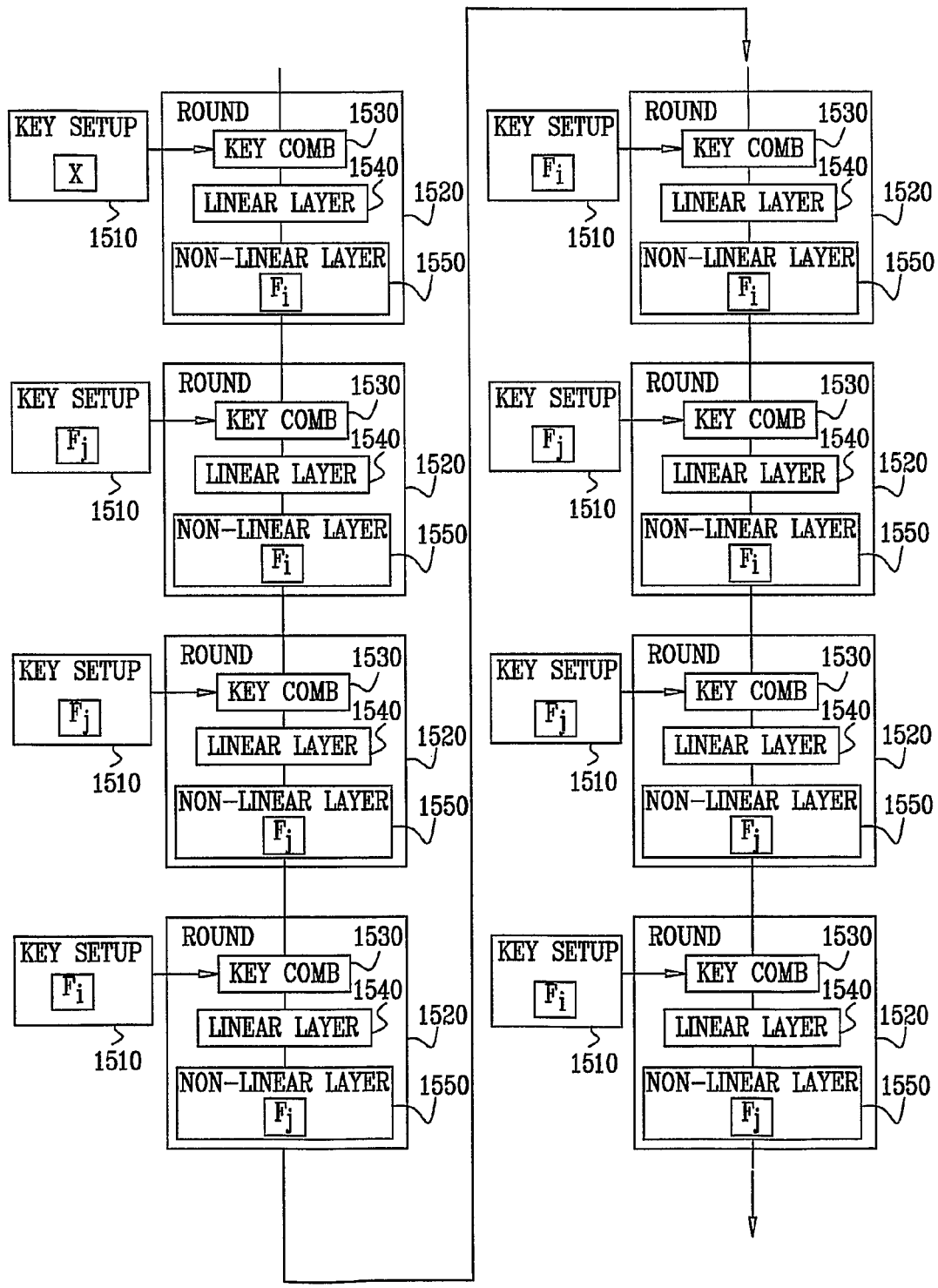
FIG. A-9

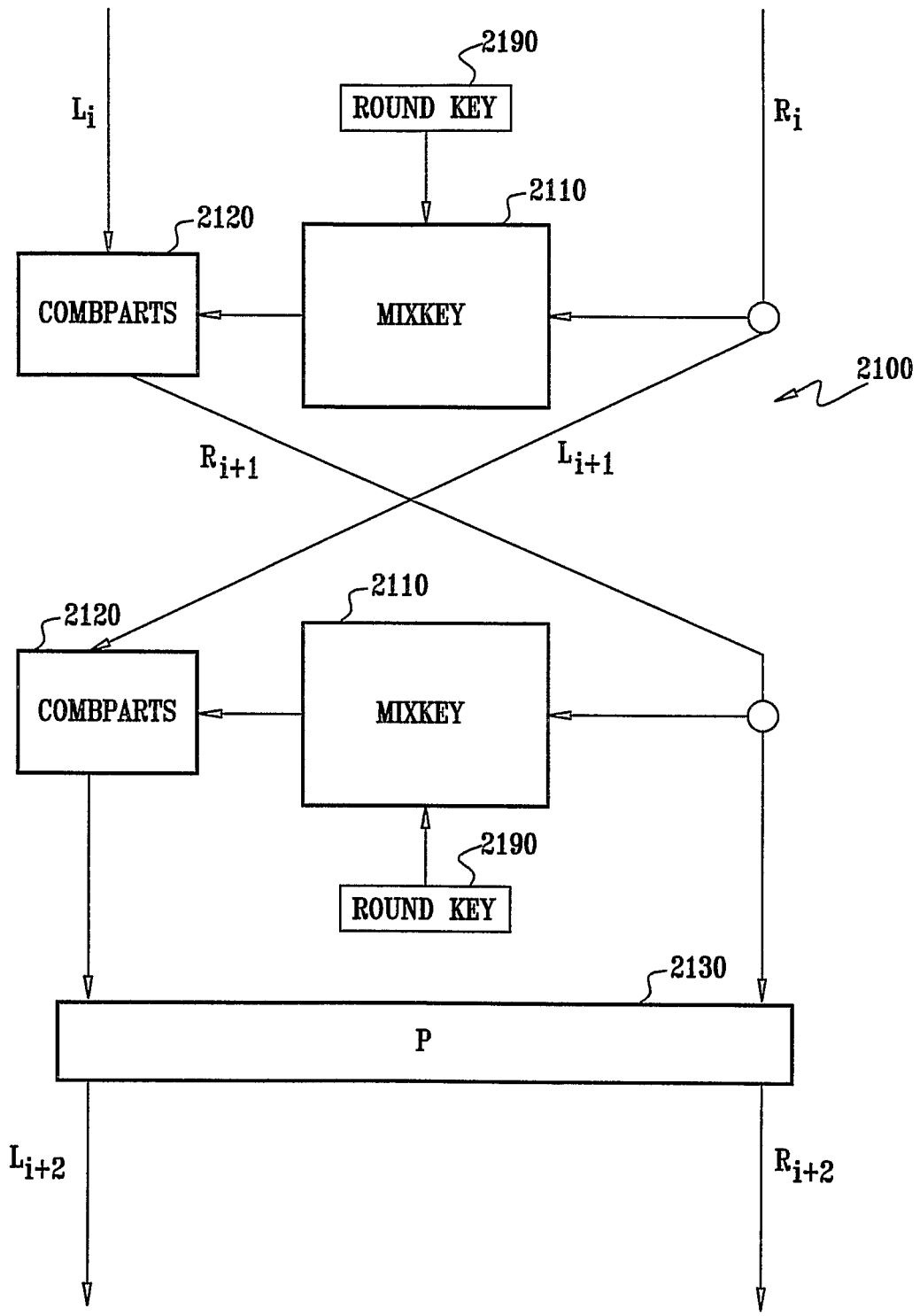
FIG. C-1

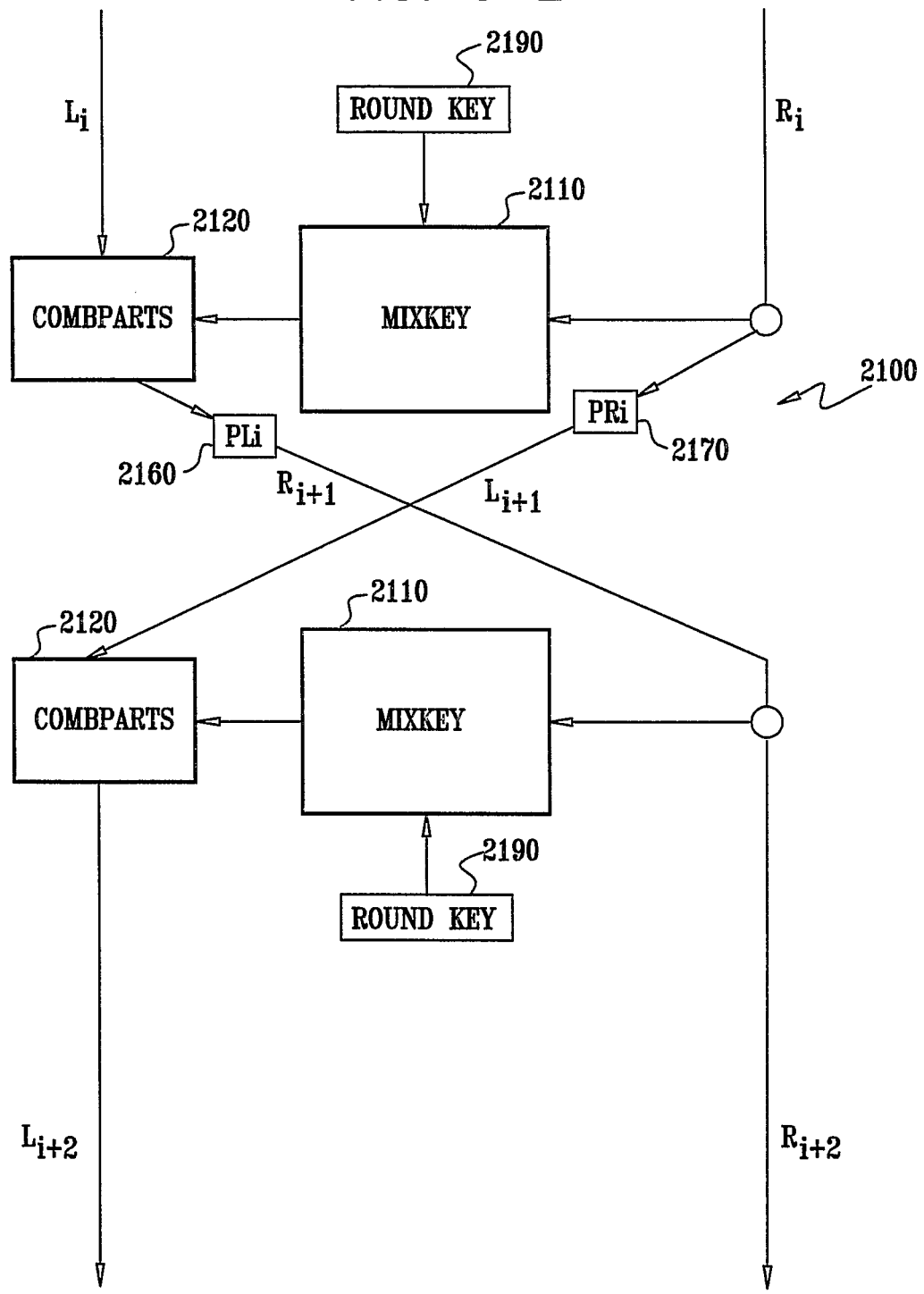
FIG. C-2

FIG. C-3
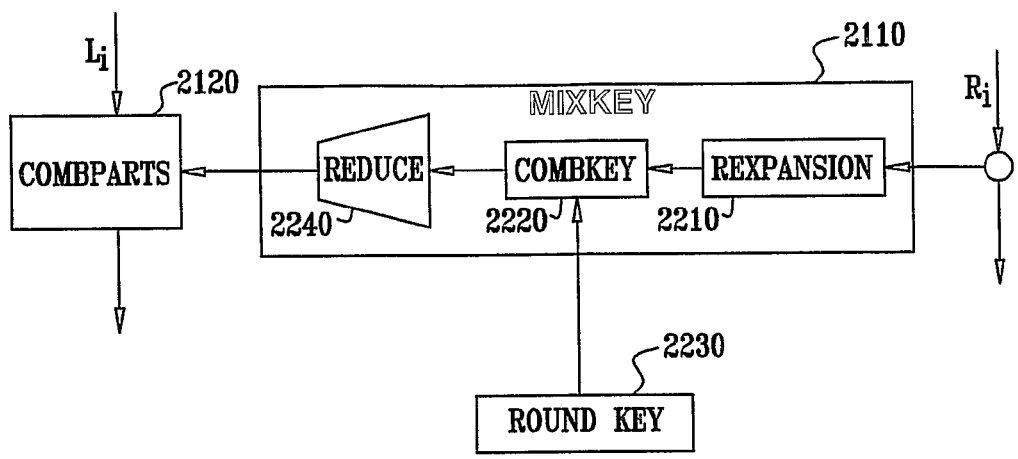
FIG. C-4
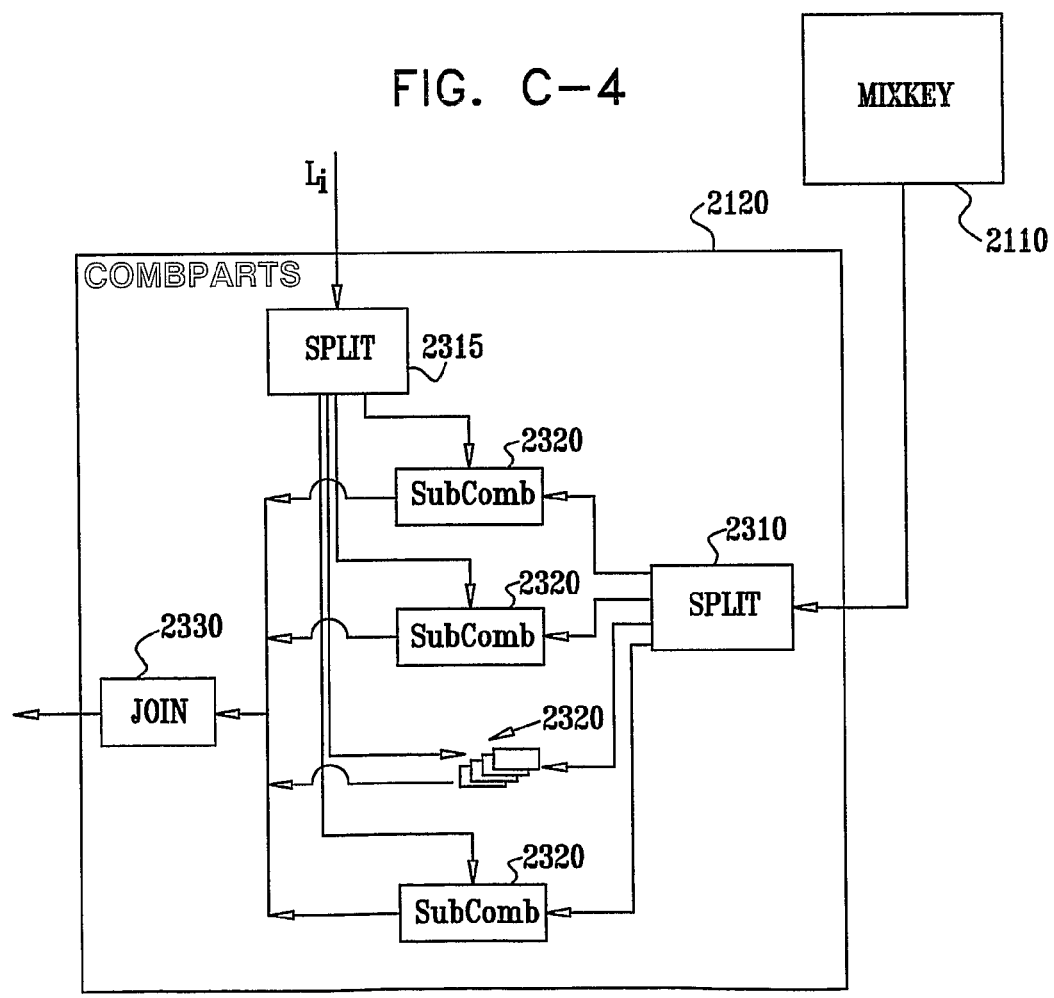

METHOD AND SYSTEM FOR BLOCK CIPHER ENCRYPTION

RELATED APPLICATION INFORMATION

The present application is a 35 USC §371 application of PCT/IL2006/001167, filed on 5 Oct. 2006 and entitled "Method and System for Block Cipher Encryption", which was published in the English language on 19 Apr. 2007 with International Publication Number WO 2007/043045, and which claims priority from Israel patent application IL 171353, filed 10 Oct. 2005; Israel patent application IL 172948, filed 2 Jan. 2006; Israel patent application IL 174141, filed 6 Mar. 2006; and Israel patent application IL 174810, filed 5 Apr. 2006.

FIELD OF THE INVENTION

The present invention relates to methods of encryption, and more particularly, to Feistel based block cipher methods of encryption

BACKGROUND OF THE INVENTION

Many encryption methods are known in the art. Of the known methods, many methods are block methods in which a block of plain text is iteratively altered according to a pre-defined rule; each such iteration is also known as a "round".

Many block encryption methods can be viewed as specific cases of Feistel networks, also termed herein "Feistel cipher methods", or "Feistel-like cipher methods"; a single round of a Feistel cipher method is termed herein a "Feistel cipher round".

Feistel ciphers are described in the *Handbook of Applied Cryptography* (A. Menezes, P. van Oorschot, and S. Vanstone, CRC Press, 1996. The *Handbook of Applied Cryptography* (HAC) is available on the Internet at www.cacr.math.uwaterloo.ca/hac). The discussion of Feistel ciphers in HAC, on pages 250-259, is incorporated herein by reference.

A Feistel cipher is an iterated block cipher mapping a plaintext (comprising two parts, $L_0$ and $R_0$, for t-bit blocks $L_0$ and $R_0$, to a ciphertext ($R_r$ and $L_r$), through an r-round process where $r \geq 1$. For $1 \leq i \leq r$, round I maps $(L_{i-1}, R_{i-1})$ using key $K_i$ to $(L_i, R_i)$ as follows: $L_i = R_{i-1}$, $R_i = L_{i-1} \oplus f(R_{i-1}, K_i)$, where each subkey $K_i$ is derived from the cipher key K (HAC, page 251).

Those skilled in the art will appreciate that although the definition above is for blocks $L_0$ and $R_0$ of equal sizes, equality of the sizes is not mandatory.

Decryption of a Feistel cipher is often achieved using the same r-round process but with subkeys used in reverse order, $K_r$ through $K_1$.

Types of block ciphers which are cases of Feistel networks include the following well-known methods: DES, Lucifer, FEAL, Khufu, Khafre, LOKI, GOST, CAST, and Blowfish.

Feistel ciphers are also discussed in *Applied Cryptography, Second Edition* (B. Schneier, John Wiley and Sons, Inc., 1996) on pages 347-351. The discussion of Feistel ciphers in *Applied Cryptography, Second Edition* is hereby incorporated herein by reference.

DES is specified in FIPS 46-3, available on the Internet at: csrc.nist.gov/publications/fips/fips46-3/fips46-3.pdf. FIPS 46-3 is hereby incorporated herein by reference.

FOX: A New Family of Block Ciphers, (Pascal Junod and Serge Vaudenay, *Selected Areas in Cryptography* 2004: Waterloo, Canada, Aug. 9-10, 2004. *Revised papers, Lecture Notes in Computer Science*. Springer-Verlag.) describes the design of a new family of block ciphers based on a Lai-Massey scheme, named FOX. The main features of the design, besides a very high security level, are a large implementation flexibility on various platforms as well as high performances. In addition, a new design of strong and efficient key-schedule algorithms is proposed. Evidence is provided that FOX is immune to linear and differential cryptanalysis.

How to Construct Pseudorandom Permutations From Pseudorandom Functions (M. Luby and C. Rackoff, SIAM Journal on Computing, 17:2, pp. 373-386, April 1988), describes a method to efficiently construct a pseudorandom invertible permutation generator from a pseudorandom function generator. A practical result described in Luby-Rackoff is that any pseudorandom bit generator can be used to construct a block private key cryptosystem which is secure against chosen plaintext attacks, which is one of the strongest known attacks against a cryptosystem.

The Serpent Cipher, specified at: www.ftp.cl.cam.ac.uk/ftp/users/rja14/serpent.pdf, was an Advanced Encryption Standard (AES) candidate. The design of the serpent cipher design is highly conservative, yet still allows a very efficient implementation. The serpent cipher uses S-boxes similar to those of DES in a new structure that simultaneously allows a more rapid avalanche, and a more efficient bitslice implementation.

The disclosures of all references mentioned above and throughout the present specification, as well as the disclosures of all references mentioned in those references, are hereby incorporated herein by reference.

SUMMARY OF THE INVENTION

The present invention seeks to provide an improved encryption method, and in particular an improved encryption method related to Feistel encryption methods. A Feistel-like cipher, described herein, is preferably designed to be easily implemented in hardware and difficult to implement in software.

There is thus provided in accordance with a preferred embodiment of the present invention providing a combining unit operative to combine a key with a block of data, the block of data expressed as a block of bits, providing a mix and condense unit operative to mix bits included in the block of bits among themselves, receiving an input including the block of data expressed as the block of bits, and combining, at the combining unit, the block of bits with a key, mixing, at the mixing and condensing unit, the combined block of bits, wherein the method of encrypting cannot be efficiently implemented except on specialized hardware.

Further in accordance with a preferred embodiment of the present invention the combining unit is operative to perform a XOR operation.

Still further in accordance with a preferred embodiment of the present invention the mix and condense unit includes a plurality of layers, each layer among the plurality of layers including a plurality of mini-functions.

Additionally in accordance with a preferred embodiment of the present invention the plurality of layers includes between 30 layers and 50 layers, inclusive.

Moreover in accordance with a preferred embodiment of the present invention a mini-function layer includes two micro-functions one balanced micro-function, and one non-linear micro-function.

Further in accordance with a preferred embodiment of the present invention the mini-function layer is operative to perform the following receiving an input, splitting the input, at a splitter, into a block of balancing bits and a block of remaining input bits, executing the method of the non-linear micro-function on the block of remaining input bits, inputting the result of the non-linear micro-function into the balanced micro-function, executing the method of the balanced micro-function on the result of the non-linear micro-function and the balancing bits, and outputting a result.

Still further in accordance with a preferred embodiment of the present invention, performing an invertible transformation on the block of balancing bits prior to the executing the method of the balanced micro-function.

Additionally in accordance with a preferred embodiment of the present invention the invertible transformation includes an S-box.

Moreover in accordance with a preferred embodiment of the present invention the S-box includes a 2bit-to-2bit S-box.

Further in accordance with a preferred embodiment of the present invention including providing a first function $F_i$ and a second function $F_j$, providing a round key generation function, the round key generation function being operative to utilize, in any given round, exactly one of the first function $F_i$, and the second function $F_j$, providing a round mixing function, the round mixing function being operative to utilize, in any given round, exactly one of the first function $F_i$, and the second function $F_j$, utilizing the round key generation function in at least a first round to generate a second round key for use in a second round, and utilizing the round mixing function in at least the first round to mix a first round key with a cipher state, wherein one of the following is performed in the first round the round key generation function utilizes the first function $F_i$ to generate the second round key for use in the second round, substantially simultaneously with the round key mixing function utilizing the second function $F_j$ to mix the first round key with the cipher state, and the round key generation function utilizes the second function $F_j$ to generate the second round key for use in the second round, substantially simultaneously with the round key mixing function utilizing the first function $F_i$ to mix the first round key with the cipher state.

There is also provided in accordance with a another preferred embodiment of the present invention providing an expansion unit operative to expand the block of data, expressed as a block of bits, from a first bit size to a second bit size, the second bit size being greater than the first bit size, providing a combining unit operative to combine an expanded block of data with a key, providing a mix and condense unit operative to mix the bits of a combined expanded block of data of the second bit size and condense the bit size of the input to a third bit size, the third bit size being less than the second bit size, receiving an input including the block of data expressed as the block of bits, inputting the block of bits into the expansion unit, and therein expanding the block of bits to a block of bits of the second bit size, combining, at the combining unit, the block of bits of the second bit size with a key, mixing, at the mixing and condensing unit, the block of bits of the second bit size, and condensing, at the mixing and condensing unit, the block of bits of the second bit size to a block of bits of the third size, thereby producing an encrypted block of data, the encrypted block of data being expressed as a block of bits of the third bit size, wherein the method of encrypting cannot be implemented except on specialized hardware.

Further in accordance with a preferred embodiment of the present invention the first bit size is equal to the third bit size.

Still further in accordance with a preferred embodiment of the present invention the first bit size is equal to 64 bits.

Additionally in accordance with a preferred embodiment of the present invention the second bit size is equal to 100 bits.

Moreover in accordance with a preferred embodiment of the present invention the third bit size is equal to 64 bits.

Further in accordance with a preferred embodiment of the present invention the combining unit is operative to perform a XOR operation.

Still further in accordance with a preferred embodiment of the present invention the expansion unit includes a linear transformation.

Additionally in accordance with a preferred embodiment of the present invention the linear transformation includes an operation wherein each input bit influences at least two output bits.

Moreover in accordance with a preferred embodiment of the present invention the linear transformation includes an operation wherein each bit of the key influences one output bit.

Further in accordance with a preferred embodiment of the present invention the linear transformation includes an operation wherein any small set of input bits influences a larger set of output bits.

Still further in accordance with a preferred embodiment of the present invention the linear transformation includes an operation wherein indices are selected so as to be spread equally between input bits and output bits.

Additionally in accordance with a preferred embodiment of the present invention the expansion unit includes two layers of gates operative to combine two inputs.

Moreover in accordance with a preferred embodiment of the present invention the gates include XOR operation gates.

Further in accordance with a preferred embodiment of the present invention and further including a NOT operation gate after the XOR operation gates.

Still further in accordance with a preferred embodiment of the present invention the mix and condense unit includes a plurality of layers, each layer among the plurality of layers including a plurality of mini-functions.

Additionally in accordance with a preferred embodiment of the present invention the plurality of layers includes between 30 layers and 50 layers, inclusive.

Moreover in accordance with a preferred embodiment of the present invention a mini-function layer includes two micro-functions one balanced micro-function, and one non-linear micro-function.

Further in accordance with a preferred embodiment of the present invention the mini-function layer is operative to perform receiving an input, splitting the input, at a splitter, into a block of balancing bits and a block of remaining input bits, executing the method of the non-linear micro-function on the block of remaining input bits, inputting the result of the non-linear micro-function into the balanced micro-function, executing the method of the balanced micro-function on the result of the non-linear micro-function and the balancing bits, and outputting a result.

Still further in accordance with a preferred embodiment of the present invention and including performing an invertible transformation on the block of balancing bits prior to the executing the method of the balanced micro-function.

Additionally in accordance with a preferred embodiment of the present invention the invertible transformation includes an S-box.

Moreover in accordance with a preferred embodiment of the present invention the S-box includes a 2bit-to-2bit S-box.

Further in accordance with a preferred embodiment of the present invention and including providing a first function $F_i$ and a second function $F_j$, providing a round key generation function, the round key generation function being operative to utilize, in any given round, exactly one of the first function $F_i$, and the second function $F_j$, providing a round mixing function, the round mixing function being operative to utilize, in any given round, exactly one of the first function $F_i$, and the second function $F_j$, utilizing the round key generation function in at least a first round to generate a second round key for use in a second round, and utilizing the round mixing function in at least the first round to mix a first round key with a cipher state, wherein one of the following is performed in the first round the round key generation function utilizes the first function $F_i$ to generate the second round key for use in the second round, substantially simultaneously with the round key mixing function utilizing the second function $F_j$ to mix the first round key with the cipher state, and the round key generation function utilizes the second function $F_j$ to generate the second round key for use in the second round, substantially simultaneously with the round key mixing function utilizing the first function $F_i$ to mix the first round key with the cipher state.

There is also provided in accordance with a still another preferred embodiment of the present invention an emulation resistant combine key method included in a Feistel-like structure.

Further in accordance with a preferred embodiment of the present invention the method is implemented in hardware.

Still in accordance with a preferred embodiment of the present invention and including mixing and condensing, the mixing and condensing including receiving an input of a block of data expressed as a block of bits, mixing the bits of the block of data with a round key.

Additionally in accordance with a preferred embodiment of the present invention and including providing an expansion unit operative to expand the block of data, expressed as a block of bits, from a first bit size to a second bit size, the second bit size being greater than the first bit size, providing a combining unit operative to combine an expanded block of data with a key, providing a mix and condense unit operative to mix the bits of a combined expanded block of data of the second bit size and condense the bit size of the input to a third bit size, the third bit size being less than the second bit size, receiving an input including the block of data expressed as the block of bits, inputting the block of bits into the expansion unit, thereby expanding the block of bits to a block of bits of the second bit size, combining, at the combining unit, the block of bits of the second bit size with a key, mixing, at the mixing and condensing unit, the block of bits of the second bit size, and condensing, at the mixing and condensing unit, the block of bits of the second bit size to a block of bits of the third size, thereby producing an encrypted block of data, the encrypted block of data being expressed as a block of bits of the third bit size.

Moreover in accordance with a preferred embodiment of the present invention the first bit size is equal to the third bit size.

Further in accordance with a preferred embodiment of the present invention the first bit size is equal to 64 bits.

Still in accordance with a preferred embodiment of the present invention the second bit size is equal to 100 bits.

Additionally in accordance with a preferred embodiment of the present invention the third bit size is equal to 64 bits.

Moreover in accordance with a preferred embodiment of the present invention the combining unit is operative to perform a XOR operation.

Further in accordance with a preferred embodiment of the present invention the expansion unit includes a linear transformation.

Still further in accordance with a preferred embodiment of the present invention the linear transformation includes an operation wherein each input bit influences at least two output bits.

Additionally in accordance with a preferred embodiment of the present invention the linear transformation includes an operation wherein each bit of the key influences one output bit.

Moreover in accordance with a preferred embodiment of the present invention the linear transformation includes an operation wherein any small set of input bits influences a larger set of output bits.

Further in accordance with a preferred embodiment of the present invention the linear transformation includes an operation wherein indices are selected so as to be spread equally between input bits and output bits.

Still further in accordance with a preferred embodiment of the present invention the mix and condense unit includes a plurality of layers, each layer among the plurality of layers including a plurality of mini-functions.

Additionally in accordance with a preferred embodiment of the present invention the plurality of layers includes between 30 layers and 50 layers, inclusive.

Moreover in accordance with a preferred embodiment of the present invention a mini-function layer includes two micro-functions one balanced micro-function, and one non-linear micro-function.

Further in accordance with a preferred embodiment of the present invention the mini-function layer is operative to perform the following receiving an input, splitting the input, at a splitter, into a block of balancing bits and a block of remaining input bits, executing the method of the non-linear micro-function on the block of remaining input bits, inputting the result of the non-linear micro-function into the balanced micro-function, executing the method of the balanced micro-function on the result of the non-linear micro-function and the balancing bits, and outputting a result.

Still further in accordance with a preferred embodiment of the present invention and including performing an invertible transformation on the block of balancing bits prior to the executing the method of the balanced micro-function.

Additionally in accordance with a preferred embodiment of the present invention the invertible transformation includes an S-box.

Moreover in accordance with a preferred embodiment of the present invention the S-box includes a 2bit-to-2bit S-box.

Further in accordance with a preferred embodiment of the present invention and further including providing a first function $F_i$ and a second function $F_j$, providing a round key generation function, the round key generation function being operative to utilize, in any given round, exactly one of the first function $F_i$, and the second function $F_j$, providing a round mixing function, the round mixing function being operative to utilize, in any given round, exactly one of the first function $F_i$, and the second function $F_j$, utilizing the round key generation function in at least a first round to generate a second round key for use in a second round, and utilizing the round mixing function in at least the first round to mix a first round key with a cipher state, wherein one of the following is performed in the first round the round key generation function utilizes the first function $F_i$ to generate the second round key for use in the second round, substantially simultaneously with the round key mixing function utilizing the second function $F_j$ to mix the first round key with the cipher state, and the round key generation function utilizes the second function $F_j$ to generate the second round key for use in the second round, substantially simultaneously with the round key mixing function utilizing the first function $F_i$ to mix the first round key with the cipher state.

There is also provided in accordance with a still another preferred embodiment of the present invention providing a combining unit operative to combine the block of data with a key, providing a mixing unit operative to mix the bits of a combined key and block of data, receiving an input including the block of data expressed as a block of bits, combining, at a combining unit, the block of bits with a key, and mixing, at the mixing unit, the block of bits, thereby producing an encrypted block of data, wherein the mix and condense unit includes a plurality of layers, each layer including a plurality of mini-functions.

Further in accordance with a preferred embodiment of the present invention the plurality of layers includes between 30 and 50 layers, inclusive.

Still further in accordance with a preferred embodiment of the present invention the combining unit is operative to perform a XOR operation.

Additionally in accordance with a preferred embodiment of the present invention a mini-function layer includes two micro-functions one balanced micro-function, and one non-linear micro-function.

Moreover in accordance with a preferred embodiment of the present invention the mini-function layer is operative to perform the following receiving an input, splitting the input, at a splitter, into a block of balancing bits and a block of remaining input bits, executing the method of the non-linear micro-function on the block of remaining input bits, inputting the result of the non-linear micro-function into the balanced micro-function, executing the method of the balanced micro-function on the result of the non-linear micro-function and the balancing bits, and outputting a result.

Further in accordance with a preferred embodiment of the present invention including performing an invertible transformation on the block of balancing bits prior to the executing the method of the balanced micro-function.

Still further in accordance with a preferred embodiment of the present invention the invertible transformation includes an S-box.

Additionally in accordance with a preferred embodiment of the present invention the S-box includes a 2bit-to-2bit S-box.

Moreover in accordance with a preferred embodiment of the present invention including providing an expansion unit operative to expand the block of data, expressed as a block of bits, from a first bit size to a second bit size, the second bit size being greater than the first bit size, and prior to the combining, inputting the block of bits into the expansion unit, and therein expanding the block of bits to a block of bits of the second bit size.

Further in accordance with a preferred embodiment of the present invention further including after the mixing, condensing, at the mixing and condensing unit, the block of bits of the second bit size to a block of bits of a third size, thereby producing an encrypted block of data, the encrypted block of data being expressed as a block of bits of the third bit size.

Still further in accordance with a preferred embodiment of the present invention including providing a first function $F_i$ and a second function $F_j$, providing a round key generation function, the round key generation function being operative to utilize, in any given round, exactly one of the first function $F_i$, and the second function $F_j$, providing a round mixing function, the round mixing function being operative to utilize, in any given round, exactly one of the first function $F_i$, and the second function $F_j$, utilizing the round key generation function in at least a first round to generate a second round key for use in a second round, and utilizing the round mixing function in at least the first round to mix a first round key with a cipher state, wherein one of the following is performed in the first round the round key generation function utilizes the first function $F_i$ to generate the second round key for use in the second round, substantially simultaneously with the round key mixing function utilizing the second function $F_j$ to mix the first round key with the cipher state, and the round key generation function utilizes the second function $F_j$ to generate the second round key for use in the second round, substantially simultaneously with the round key mixing function utilizing the first function $F_i$ to mix the first round key with the cipher state.

There is also provided in accordance with a still another preferred embodiment of the present invention combining a control input derived from a right part of a Feistel-like structure with a transformation input including a left part of the Feistel-like structure, and producing an output including a combination of bits included in the control input and bits included in the transformation input, wherein no bit of the combination of bits includes a linear combination of bits from the control input and bits from the transformation input.

Further in accordance with a preferred embodiment of the present invention with respect to a fixed control input, the method includes an invertible method.

Still further in accordance with a preferred embodiment of the present invention the inverse of the method is not identical to the method.

Additionally in accordance with a preferred embodiment of the present invention the method includes a non-linear layer including at least one S-box.

Moreover in accordance with a preferred embodiment of the present invention and also including a linear transformation of the control input and the transformation input.

Further in accordance with a preferred embodiment of the present invention and also including splitting, at a control input splitter, the control input, into a plurality of control input sub-blocks, splitting, at a transformation input splitter, the transformation input, into a plurality of transformation input sub-blocks, linearly combining each one of the plurality of control input sub-blocks with a corresponding one of the plurality of transformation input sub-blocks, and joining the result of the linear combing at a output joiner.

Still further in accordance with a preferred embodiment of the present invention each one of the plurality of control input sub-blocks and a corresponding one of the plurality of transformation input sub-blocks include sub-blocks of the same size.

Additionally in accordance with a preferred embodiment of the present invention a first sub-block of the plurality of control input sub-blocks includes a sub-block of a different size than a second sub-block of the plurality of control input sub-blocks.

Moreover in accordance with a preferred embodiment of the present invention the transformation input splitter permutes the transformation input prior to the splitting at the transformation input splitter.

Further in accordance with a preferred embodiment of the present invention the output joiner permutes an output after the joining operation.

Still further in accordance with a preferred embodiment of the present invention the linearly combining includes $(A(C) \times I) \oplus C$, where C represents the control input sub-block, I represents the transformation input sub-block, and $A(C)$ includes a matrix depending on C, of size m×m, where m is a size of the control input sub-block.

Additionally in accordance with a preferred embodiment of the present invention $$A(C) = \begin{bmatrix} 1 & C[0] & 0 & 0 \\ 0 & 1 & C[1] & 0 \\ 0 & 0 & 1 & C[2] \\ 0 & 0 & 0 & 1 \end{bmatrix} \times \begin{bmatrix} 1 & 0 & 0 & 0 \\ C[1] & 1 & 0 & 0 \\ 0 & C[2] & 1 & 0 \\ 0 & 0 & C[3] & 1 \end{bmatrix}$$

where C[0 . . . 3] include bits included in the control input.

Moreover in accordance with a preferred embodiment of the present invention and also including a non-linear layer including at least one S-box.

Further in accordance with a preferred embodiment of the present invention an output from the linear transformation includes an input for the non-linear layer.

Still further in accordance with a preferred embodiment of the present invention an output from the non-linear layer includes a transformation input for the linear transformation.

Additionally in accordance with a preferred embodiment of the present invention at least one of the S-boxes includes an S-box according to the Serpent Cipher specification.

Moreover in accordance with a preferred embodiment of the present invention the S-box layer includes S-boxes which are simple to implement in hardware.

Further in accordance with a preferred embodiment of the present invention the method is cryptographically secure and non-involutable.

There is also provided in accordance with a still another preferred embodiment of the present invention a multi-round Feistel-like cipher including a permutation layer ("P-box") wherein the P-box is used in less than all rounds of the Feistel-like cipher.

Further in accordance with a preferred embodiment of the present invention the P-box is used in every second round of the Feistel-like cipher.

There is also provided in accordance with a still another preferred embodiment of the present invention a combining unit operative to combine a key with a block of data, the block of data being expressed as a block of bits, and a mix and condense unit operative to mix bits included in the block of bits among themselves, wherein a received input including the block of data expressed as the block of bits is combined, at the combining unit, with a key, and bits included in the combined block of bits are mixed among themselves at the mixing and condensing unit, and the encryption cannot be efficiently implemented except on specialized hardware.

There is also provided in accordance with a still another preferred embodiment of the present invention an expansion unit operative to expand the block of data, expressed as a block of bits, from a first bit size to a second bit size, the second bit size being greater than the first bit size, thereby producing an expanded block of data, a combining unit operative to receive the expanded block of data from the expansion unit and combine the expanded block of data with a key thereby producing a combined expanded block of data of the second bit size, and a mix and condense unit operative to mix the bits of the combined expanded block of data of the second bit size and condense the bit size of the combined expanded block of data of the second bit size to a third bit size, the third bit size being less than the second bit size, wherein the encryptor cannot be implemented except on specialized hardware.

There is also provided in accordance with a still another preferred embodiment of the present invention a Feistel-like structure operative to encrypt a block of data, the Feistel-like structure including an emulation resistant combine key unit.

There is also provided in accordance with a still another preferred embodiment of the present invention an encryptor operative to encrypt a block of data, the encryptor including a combining unit operative to combine the block of data with a key and produce a combined key and block of data, and a mixing unit operative to mix the bits of the combined key and block of data, wherein the mixing unit includes a plurality of layers, each layer including a plurality of mini-functions.

There is also provided in accordance with a still another preferred embodiment of the present invention a combiner operative to combine a control input derived from a right part of a Feistel-like structure with a transformation input including a left part of the Feistel-like structure, and an outputter operative to producing an output including a combination of bits included in the control input and bits included in the transformation input, wherein no bit of the combination of bits includes a linear combination of bits from the control input and bits from the transformation input.

BRIEF DESCRIPTION OF THE DRAWINGS AND APPENDICES

The present invention will be understood and appreciated more fully from the following detailed description, taken in conjunction with the drawings in which:

FIG. 1 is an illustration of a hardened Feistel-like structure constructed and operative in accordance with a preferred embodiment of the present invention;

FIG. 2 is an illustration of a Combine Key RightPart function comprised in the hardened Feistel-like structure of FIG. 1;

FIG. 3 is an illustration of a preferred implementation of hardware for a RightPart Expansion Function comprised in the Combine Key RightPart function of FIG. 2;

FIG. 4 is an illustration of a preferred embodiment of a mini-function, the mini-function serving as a building block for a Mix and Condense function comprised in the Combine Key RightPart function of FIG. 2;

FIG. 5 is an illustration of a Combine RightPart Combine LeftPart function comprised in the hardened Feistel-like structure of FIG. 1;

FIG. 6 is an illustration of one preferred implementation of a linear layer in the Combine RightPart Combine LeftPart function of FIG. 5;

FIG. 7 is an illustration of one preferred implementation of an S-boxes layer in the Combine RightPart Combine LeftPart function of FIG. 5;

FIG. 8 is an illustration of one preferred implementation of a key expansion function comprised in the hardened Feistel-like structure of FIG. 1;

FIG. 9 is an illustration of one preferred implementation of round key generation utilizing the Mix and Condense function in the key expansion function of FIG. 8;

FIGS. 10-13 are simplified flowchart illustrations of preferred alternative methods of operation of the hardened Feistel-like structure of FIG. 1, in accordance with preferred embodiments thereof;

FIG. A-1 is a simplified block diagram illustration of a system for robust cipher design constructed and operative in accordance with a preferred embodiment of the invention described in Appendix A;

FIG. A-2 is a time line showing one preferred implementation of the relationship between key expansion and encryption rounds in a cipher designed according to the method of FIG. A-1;

FIG. A-3A is a simplified block diagram illustration depicting the use of MUX and DEMUX modules in a preferred implementation of the method of FIG. A-1;

FIG. A-3B is a simplified block diagram illustration of a preferred implementation of a round key generation function operative to generate round keys in a cipher designed according to the method of FIG. A-1;

FIG. A-4 is a simplified block diagram illustration of four rounds of a typical Feistel block cipher constructed and operative in accordance with the system of FIG. A-1;

FIG. A-5 is a simplified block diagram illustration of four rounds of a typical AES-like block cipher constructed and operative in accordance with the system of FIG. A-1;

FIG. A-6 is a simplified block diagram illustration of eight rounds of a typical Feistel block cipher constructed and operative in accordance with an alternative preferred embodiment of the system of FIG. A-1;

FIG. A-7 is a simplified block diagram illustration of eight rounds of a typical AES-like block cipher constructed and operative in accordance with an alternative preferred embodiment of the system of FIG. A-1;

FIG. A-8 is a simplified block diagram illustration of eight rounds of a typical Feistel block cipher constructed and operative in accordance with yet another alternative preferred embodiment of the system of FIG. A-1;

FIG. A-9 is a simplified block diagram illustration of eight rounds of a typical AES-like block cipher constructed and operative in accordance with yet another alternative preferred embodiment of the system of FIG. A-1;

FIG. C-1 is an illustration of a hardened Feistel-like structure constructed and operative in accordance with a preferred embodiment of the present invention;

FIG. C-2 is an illustration of an alternative preferred embodiment of the hardened Feistel-like structure of FIG. C-1;

FIG. C-3 is a simplified block diagram of a preferred implementation of a MixKey function of the system of FIG. C-1; and FIG. C-4 is a simplified block diagram of a CombParts function of the system of FIG. C-1.

The following Appendices may be helpful in understanding certain preferred embodiments of the present invention:

Appendix A is a description of a method for robust cipher design, comprising a preferred method of key expansion and set up and a preferred implementation of a round key encryption function, the method of Appendix A comprising a preferred implementation of the Feistel-like structure of FIG. 1;

Appendix B is a copy of Appendix A.5 of the Serpent Cipher specification, describing S-boxes $S_0$ through $S_7$ of the Serpent Cipher; and Appendix C comprises a description of certain alternative preferred embodiments of the present invention.

DETAILED DESCRIPTION OF A PREFERRED EMBODIMENT

Reference is now made to FIG. 1, which is an illustration of a hardened Feistel-like structure 100 constructed and operative in accordance with a preferred embodiment of the present invention. It is appreciated that FIG. 1 provides an illustration of data structures and methods for implementing an encryption network, the illustration being drawn in a format which is well known in the art. FIG. 1 depicts two rounds of the hardened Feistel-like structure 100, it being appreciated that a plurality of rounds comprising more than two rounds is preferred, similarly to the plurality of rounds known in the prior art in the case of Feistel-like networks.

The Feistel-like structure 100 of FIG. 1 comprises a Combine Key RightPart (CKR) function 110, a preferred implementation of which is described below with reference to FIG. 2, and a Combine RightPart Combine LeftPart (CRL) function 120, a preferred implementation of which is described below described below with reference to FIG. 5. A preferred implementation of a key expansion function (not depicted in FIG. 1), operative to provide a round key ($RK_i$, $RK_{i+1}$) for each round of the Feistel-like structure 100 is described below with reference to FIG. 8.

In each round of the hardened Feistel-like structure 100, two halves of a plaintext, left and right, depicted as L and R, are operated on by the CKR function 110 and the CRL function 120. It is appreciated that in each round, L and R preferably have an identical size of 64 bits. It is nevertheless appreciated that L and R may be any equal size, and 64 bits is used herein as an example. It is further appreciated that the size of the round key, $RK_i$, is described herein as 100 bits by way of example, only. $RK_i$ may be any appropriate size.

It is appreciated that the plurality of rounds may preferably be preceded by preprocessing of L and R. For example, L and R may preferably be permuted according to a pre-defined permutation in the same manner the DES block cipher permutes the input before the first round (refer to FIPS 46-3). It is further appreciated that after the plurality of rounds are completed, an encrypted output of the hardened Feistel-like structure 100 may be post-processed. For example, output may preferably be further permuted according to a pre-defined permutation in the same manner the DES block cipher permutes the state after the $16^{th}$ round (refer to FIPS 46-3).

For any given n rounds of the hardened Feistel-like structure 100, a particular round (first round, last round, or any other round) may preferably differ from the other n−1 rounds.

The Feistel-like structure 100 preferably uses a 128-bit key to encrypt and decrypt 128-bit blocks. The number of rounds (RN) is preferably RN between 40 and 50, inclusive.

It is appreciated that the Feistel-like structure 100 is preferably less efficient if implemented in software.

The Feistel-like structure 100 preferably utilizes CKR 110 to integrate a round key with a right half of a state and the function CRL 120 to combine the result of the key integration with a left half of the state. The left and right halves of the state are referred below as L and R, respectively.

Reference is now made to FIG. 2, which is an illustration of a Combine Key RightPart (CKR) function 110 comprised in the hardened Feistel-like structure of FIG. 1.

The CKR function 110 preferably comprises the following operations:

1. RExp (Right Part Expansion) 210 preferably expands the right half R from 64 to 100 bits;

2. Using a XOR operation 220, a 100 bit round key, $RK_i$, is preferably combined with the expanded 100 bit right half;

3. MCF (Mix and Condense Function) 230 preferably mixes the 100 bit result of RExp 210 and, preferably in a pseudorandom fashion, preferably condenses the mixed 100 bits to 64 bits.

Reference is now made to FIG. 3, which is an illustration of a preferred implementation of hardware for a RightPart Expansion Function comprised in the Combine Key RightPart function of FIG. 2. It is appreciated that FIG. 3 provides an illustration of a preferred implementation of hardware structures and methods for implementing an expansion function, the illustration being drawn in a format which is well known in the art. RExp 210 (FIG. 2) preferably uses a linear transformation to expand the 64 bit R into a 100 bit expanded RightPart, where each of the 100 bit output bits is the result of a XORing of 2 or 3 input bits.

Indices implemented in the proposed hardware of FIG. 3 are preferably selected pseudo-randomly with the following constraints:

1. Each one of the 64 input bits of the R preferably influences at least two output bits;
2. Each bit of the 100 bit round key preferably influences exactly one output bit;
3. Indices are preferably selected so as to be spread equally between the input and output bits, thereby avoiding a situation where a small number of input bits influence only a small number of output bits; and
4. Any small set of input bits preferably influences a larger set of output bits.

Those skilled in the art will appreciate that error correcting codes, such as the well known Hamming error correcting code, share similar design criteria with the indices implemented in the proposed hardware and thus, error correcting codes may be well suited for use as the indices implemented in the proposed hardware.

It is preferable that the RExp function 210 (FIG. 2) and the subsequent XOR 220 operation (with the round key) balance between a proper mixing of the round key with the right part and a time-efficient implementation of the mixing, thereby allowing a hardware implementation of both the RExp function 210 (FIG. 2) and the XOR 220 operation that preferably comprises only two layers of XOR operations (and, in some preferred embodiments, an additional layer of NOT gates).

Returning to the discussion of FIG. 2, the MCF function 230 is now discussed. The 100 bit expanded right half, after XORing with the 100 bit round key $RK_i$, is preferably input into the MCF function 230. A 100 bit result of the XORing is preferably reduced and condensed into a 64-bit temporary result, which is used later as a control input of the CRL function (described with reference to FIG. 5). The MCF function 230 is preferably critical in making the Feistel-like structure 100 (FIG. 1) emulation resistant.

Reference is now made to FIG. 4, which is an illustration of a preferred embodiment of the mini-function, the mini-function serving as a building block for the MCF function 230 (FIG. 2) comprised in the CKR function 110 of FIG. 2.

The MCF function preferably uses between round key generation function and 50, inclusive, layers of mini-functions 400, where each of the mini-functions 400 preferably comprises two micro-functions, a balanced micro-function BF 410 and a non-linear micro-function NLF 420.

A balanced micro-function BF 410 is defined as follows: a set of the input bits for the balanced function are denoted as the balancing set and for every selection of the other input bits, a uniform distribution on the balancing set guarantees uniform distribution on the output (i.e., a uniform distribution of zeros and ones input guarantees a uniform distribution of zeros and ones output). For example and without limiting the generality of the foregoing, a XOR operation is a balanced function for which each of the input bits is a balancing set.

The mini-functions 400 are preferably designed as follows:
the input bits are preferably input into a splitter 415, which splits the balancing set of bits from the other input bits;
NLF 420 is preferably executed on the other input bits; and afterwards BF 410 is preferably executed on the output of NLF 420 and on the balancing set of bits, received from the splitter 415.

In some preferred embodiments of the present invention, the balancing set of bits goes through a third type of micro-functions, comprising an invertible transformation, such as a 2bit-to-2bit S-box, where the balancing set comprises 2 bits. Putting the balancing set through the invertible transformation is preferably performed simultaneously with the NLF, and thus, employing the third micro-function can be performed preferably without cost in execution time.

For example and without limiting the generality of the foregoing, the following functions process 3-bit inputs (according to the design criteria stated immediately above):

(input1 ∨ input2)⊕input3;
NOT ((input1 ∧ input2)⊕input3);
The Majority function; and
MUX, where a single bit selects which of the two other input bits to output.

The mini-functions 400 in layer i preferably receive inputs from the outputs of the mini-functions 400 in layer i−1. Selection of which output of layer i−1 goes to which input of layer i is preferably performed in a manner that preferably maximizes the mixing between layers and thus preferably avoids localization effects.

It is preferable that the exact MCF 230 (FIG. 2) utilized is automatically generated during design. However, the MCF utilized preferably passes several statistical tests measuring correlation between output bits (in particular, linear correlations). The statistical tests are preferably not restricted to input and output, but preferably also measure correlations in internal layers between inputs and outputs. In addition, it is preferable that it is not possible to express any small set of output bits of MCF 230 (FIG. 2) as a short expression of input bits of MCF 230 (FIG. 2).

Reference is now made to Appendix A, which is a description of a method for robust cipher design, comprising a preferred method of key expansion and set up and a preferred implementation of a round key encryption function, the method of Appendix A comprising a preferred implementation of the Feistel-like structure of FIG. 1. In order to harden the Feistel-like structure 100 (FIG. 1) and prevent single points of failure, MCF 230 (FIG. 2) preferably is implemented in two versions. The two versions are preferably used in an alternating manner throughout the rounds of the Feistel-like structure 100 (FIG. 1). It is appreciated that even if one of the two versions is found to be "faulty", the Feistel-like structure 100 (FIG. 1) as a whole preferably remains strong. A "faulty" function in the present context is either a cryptographically weak function (e.g., having strong linear or differential properties) or a function that is easy to emulate in software.

Reference is now made to FIG. 5, which is an illustration of a Combine RightPart Combine LeftPart (CRL) function 120 comprised in the hardened Feistel-like structure 100 of FIG. 1. The CRL 120 function combines the 64-bit result of the MCF 230 as the last stage of the CKR 110 with the unchanged 64-bit left half $L_i$ to get a new 64-bit pseudo-random right half, $R_{i+1}$.

The CRL function 120 preferably complies with the following design criteria:

1. CRL 120 is preferably invertible in a second parameter when fixing a first parameter. That is, there shall be ICRL, such that, for every X, Y, ICRL(X, CRL(X, Y))=Y, where the CKR 110 result is used as the first parameter X (also denoted hereinafter as the "control input") and the left half, $L_i$, is used as the second parameter Y (also denoted hereinafter as the "transform input").

2. CRL 120 is preferably not an involution. That is, ICRL preferably differs significantly from CRL 120 (as opposed, for example, to the XOR function that is used in DES).

The CRL function 120 preferably comprises two stages, each stage working on small sub-blocks. In preferred embodiment of the present invention, each sub-block comprises 4 bits. After each of the stages, a permutation is preferably applied to the result, breaking any locality effect of working on small sub-blocks.

The first stage comprises a linear layer LL 510 that mixes the control input with the transform input.

After LL 510, a bit-permutation PL 520 is preferably applied to the result of the LL 510.

Afterwards, the output of PL 520 is preferably input into an S-boxes layer SL 530, comprised of sixteen 4-bit to 4-bit S-boxes.

Finally, a bit-permutation (not depicted) is preferably applied to the output of SL 530.

Reference is now made to FIG. 6, which an illustration of one preferred implementation of the linear layer 510 in the Combine RightPart Combine LeftPart (CRL) function 120 of FIG. 5. LL 510 comprises a first splitter 610 which splits transform input, $L_i$, into 4-bit micro-blocks. Similarly, a second splitter splits control input into 4-bit micro-blocks. The 4-bit micro-blocks resulting from the control input are preferably used to determine a linear transformation (LT). The determined transformation is preferably applied to the input 4-bit micro-blocks, thereby producing a 4-bit output micro-block. Linear transform operations of the control data 4-bit micro-blocks and the transform data 4-bit micro-blocks are depicted in FIG. 6 as "LT".

For the control bits C[0 . . . 3] and the input bits I[0 . . . 3] the linear transformation preferably O=(A(C)×I)⊕C where A(C) is a linear transformation depending on control input C:

$$A(C) = \begin{bmatrix} A_{11}(C) & A_{12}(C) & A_{13}(C) & A_{14}(C) \\ A_{21}(C) & A_{22}(C) & A_{23}(C) & A_{24}(C) \\ A_{31}(C) & A_{32}(C) & A_{33}(C) & A_{34}(C) \\ A_{41}(C) & A_{42}(C) & A_{43}(C) & A_{44}(C) \end{bmatrix}$$

for $A_{ij}$s which are 4bit-to-1bit functions which are applied to the control input, and O is the resulting output.
A(C) is invertible; that is there exists B(C), such that:

$$B(C) = \begin{bmatrix} B_{11}(C) & B_{12}(C) & B_{13}(C) & B_{14}(C) \\ B_{21}(C) & B_{22}(C) & B_{23}(C) & B_{24}(C) \\ B_{31}(C) & B_{32}(C) & B_{33}(C) & B_{34}(C) \\ B_{41}(C) & B_{42}(C) & B_{43}(C) & B_{44}(C) \end{bmatrix}$$

such that for every control input C:

$$A(C) \times B(C) = \begin{bmatrix} 1 & 0 & 0 & 0 \\ 0 & 1 & 0 & 0 \\ 0 & 0 & 1 & 0 \\ 0 & 0 & 0 & 1 \end{bmatrix};$$

that is A(C) is the inverse of B(C).

In preferred embodiments of the present invention A(C) comprises:

$$\begin{bmatrix} A_{11}(C) & A_{12}(C) & A_{13}(C) & A_{14}(C) \\ A_{21}(C) & A_{22}(C) & A_{23}(C) & A_{24}(C) \\ A_{31}(C) & A_{32}(C) & A_{33}(C) & A_{34}(C) \\ A_{41}(C) & A_{42}(C) & A_{43}(C) & A_{44}(C) \end{bmatrix} = \qquad \text{(equation 1)}$$

$$\begin{bmatrix} 1 & C[0] & 0 & 0 \\ 0 & 1 & C[1] & 0 \\ 0 & 0 & 1 & C[2] \\ 0 & 0 & 0 & 1 \end{bmatrix} \times \begin{bmatrix} 1 & 0 & 0 & 0 \\ C[1] & 1 & 0 & 0 \\ 0 & C[2] & 1 & 0 \\ 0 & 0 & C[3] & 1 \end{bmatrix}$$

It is appreciated that if the transformation A(C) is used during decryption, then during encryption the inverse transformation of A(C) is used. In particular, if A(C) is as described in equation 1, then, since both matrices comprising control bits used in equation 1 are involutions, the inverse transformation B(C) is the composition of the transformations in reversed order. The results of all linear transformations are preferably input into join function 630. Join function 630 preferably joins the results of all 16 linear transformations into one 64 bit value.

The 64 bit output of join function 630 is preferably input into bit-permutation PL 520, thereby producing a 64 bit permuted output. Bit-permutations are well known cryptographic structures.

Reference is now made to FIG. 7, which is an illustration of one preferred implementation of an S-boxes layer in the Combine RightPart Combine LeftPart (CRL) function 120 of FIG. 5. The layer of S-boxes SL 530 (FIG. 5) preferably comprises 4-bit to 4-bit S-boxes, which are preferably simple to implement in hardware and still comprise a significant contribution to non-linearity of the hardened Feistel-like structure 100 (FIG. 1). The 64-bit input is input into an S-box splitter 710. The S-box splitter 710 preferably divides the 64-bit input into 16 4-bit micro-blocks. The 16 4-bit micro-blocks go through sixteen S-boxes 720. Output from the sixteen S-boxes 720 is all mixed in a bit permutation join function 730.

The specification of the Serpent cipher (refer to www.ftp.cl.cam.ac.uk/ftp/users/rja14/serpent.pdf) describes eight 4bit-to-4bit S-boxes, which were optimized against linear and differential attacks. It is the opinion of the inventors of the present invention that the S-boxes described in the specification of the Serpent cipher should preferably be used in the hardened Feistel structure 100 (FIG. 1) described herein. Reference is now made to Appendix B which is a copy of Appendix A.5 of the Serpent Cipher specification, describing S-boxes $S_0$ through $S_7$ of the Serpent Cipher.

Reference is now made to FIG. 8, which is an illustration of one preferred implementation of a key expansion function 800 comprised in the hardened Feistel-like structure 100 of FIG. 1. The key setup function 800 preferably extends a 128-bit key to RN 100-bit round keys (RN is the number of rounds). The key expansion function is preferably designed according to the following principles:

1. Preferably reuse available hardware functions.
2. Preferably enhance robustness of the hardened Feistel-like structure 100 (FIG. 1), as discussed above, with reference to the discussion of Appendix A.
3. Preferably allow both forward and backward generation of the round keys.

As discussed above, with reference to the discussion of Appendix A, the key expansion function 800 takes advantage of the fact that the MCF preferably comprises two variations; one variation is preferably active during any round in the MCF function for the CKR 110 (FIG. 2), while the other variation is preferably available for use. The key expansion function 800 therefore preferably uses the available MCF function in order to generate the round keys in a cryptographically secure manner.

Imitating a typical design for stream ciphers, the key setup function 800 preferably employs two functions; a first function, state update 810, is preferably operative to update a state. The second function, round key generation 830, preferably derives a new round key 840 from the new state. The state update 810 and round key generation 830 functions are executed in an alternating order generating round keys 840 which are preferably cryptographically decoupled from the key itself, as well as from each other.

The state of the key setup is preferably a 128-bit shift register. The 128-bit shift register is initialized 850 with the 128-bit key. The state update function 810 preferably comprises a circular rotation of the 128-bit register. It is appreciated that the number of rounds (RN) is preferably smaller than the size of the 128-bit register, and thus the state update function preferably does not loop during a round.

During decryption, in order to get the round keys in the proper order (reverse order from the order used during encryption), a decrypter preferably receives the state in reverse order used during encryption. In some preferred embodiments of the present invention, decryption preferably begins with shifting the shift register as many times as needed in order to get the state appropriate for the last round key. Each subsequent round then preferably shifts the state in the opposite direction to the direction used to circularly shift the state during encryption.

It is appreciated that replacement of a short LFSR (left shift register) with 2-3 smaller LFSRs may be preferable. If 2-3 smaller LFSRs are utilized, the decryption key is the result of applying a linear transformation (calculated in advance and hard-wired) on the encryption key, and then the LFSRs are preferably rolled back to get the round keys in the reverse order.

In order to avoid weak keys and slide attacks, an additional XOR with a predefined round string may preferably be applied after the state update function 810.

Reference is now made to FIG. 9, which is an illustration of one preferred implementation of round key generation 830 utilizing the Mix and Condense function (MCF) 230 (FIG. 2) in the key expansion function 800 of FIG. 8. The round key generation 830 function inputs the 128-bit state into the MCF 230 (FIG. 2) and takes the 100-bit output as the next round key, as discussed above with reference to Appendix A.

The following are design principles for selecting the order of using the MCF variations in the key setup and the round operation:

1. Preferably allow a smooth pipeline between the round operation and the key setup. Specifically, have both functions active together where one generates the key for the next round and the other is used for the round operation itself.

2. Preferably use as many different combinations as possible, maximizing the distribution of the "responsibility" for both security and emulation resistance.

As discussed in greater detail in Appendix A, for two MCF functions A and B, the round operation preferably uses A and B in the following order: A A B B A A B B A A B B A A B B . . . .

The key setup operation uses the function that is left available, i.e., B on rounds 1, 2 (preparing the keys for round 2, 3), A on round 3, 4 (preparing the key for round 4, 5) etc.

Thus the rounds of the hardened Feistel-like structure 100 (FIG. 1) have the following combinations as round key derivation and round operation:
Round 4t+1: AA;
Round 4t+2: BA;
Round 4t+3: BB; and
Round 4t+4: AB.

Alternative preferred implementations are discussed at length in Appendix A.

The implementation of MCF 230 (FIG. 2) that is preferably used in the round operation and the MCF that is used in the key expansion have different sizes of inputs and outputs. Specifically, a 128 bit value is preferably input in order to produce a 100 bit output for key setup, and a 100 bit value is preferably input in order to produce a 64 bit output for a round operation.

In order to use the same hardware for both operations, the implemented MCFs are preferably implantations of 100 bits going to 128 bits going to 100 bits going to 64 bits, where most of the layers are in the 128 bits going to 100 bits part. Thus, the round operation uses the whole function and the key expansion uses only the middle part of the function. The blowing effect herein described also contributes to preferably making the function hard to emulate in software.

Reference is now made to FIGS. 10-13, which are simplified flowchart illustrations of preferred alternative methods of operation of the hardened Feistel-like structure of FIG. 1, in accordance with preferred embodiments thereof. The methods of FIGS. 10-13 are believed to be self explanatory with reference to the above discussion.

Reference is now made to Appendix C, which comprises a description of certain alternative preferred embodiments of the present invention.

It is appreciated that software components of the present invention may, if desired, be implemented in ROM (read only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

APPENDIX A

Robust Cipher Design

FIELD OF THE INVENTION

The present invention relates to methods of encryption, and more particularly, to fault tolerant cipher design.

BACKGROUND OF THE INVENTION

Block ciphers are a well known family of symmetric key-based ciphers. Block ciphers operate on plain text in groups of bits. The groups of bits are referred to as blocks. Block ciphers are dealt with at length in Chapters 12-15 of *Applied Cryptography*, Second Edition, by Bruce Schneier, published by John Wiley and Sons, 1996. Many block ciphers are constructed by repeatedly applying a function. Such block ciphers are known as iterated block ciphers. An iteration of the block cipher is termed a round, and the repeated function is termed a round function. The number of times the round is repeated in an iterated block cipher is referred to as a round number (RN).

One block cipher, DES, is specified in FIPS 46-3, available on the Internet at: csrc.nist.gov/publications/fips/fips46-3/fips46-3.pdf. FIPS 46-3 is hereby incorporated herein by reference.

A second well known block cipher, AES, is specified in FIPS197, available on the Internet at: csrc.nist.gov/publications/fips/fips197/fips-197.pdf. FIPS197 is hereby incorporated herein by reference.

The disclosures of all references mentioned above and throughout the present specification, as well as the disclosures of all references mentioned in those references, are hereby incorporated herein by reference.

SUMMARY OF THE INVENTION

The present invention seeks to provide an improved method and system for cipher design.

There is thus provided in accordance with a preferred embodiment of the present invention providing a first function $F_i$ and a second function $F_j$, providing a round key generation function, the round key generation function being operative to utilize, in any given round, exactly one of the first function $F_i$, and the second function $F_j$, providing a round mixing function, the round mixing function being operative to utilize, in any given round, exactly one of the first function $F_i$, and the second function $F_j$, utilizing the round key generation function in at least a first round to generate a second round key for use in a second round, and utilizing the round mixing function in at least the first round to mix a first round key with a cipher state, wherein one of the following is performed in the first round the round key generation function utilizes the first function $F_1$ to generate the second round key for use in the second round, substantially simultaneously with the round key mixing function utilizing the second function $F_j$ to mix the first round key with the cipher state, and the round key generation function utilizes the second function $F_j$ to generate the second round key for use in the second round, substantially simultaneously with the round key mixing function utilizing the first function $F_i$ to mix the first round key with the cipher state.

BRIEF DESCRIPTION OF THE DRAWINGS

The present invention will be understood and appreciated more fully from the following detailed description, taken in conjunction with the drawings in which:

FIG. A-1 is a simplified block diagram illustration of a system for robust cipher design constructed and operative in accordance with a preferred embodiment of the present invention;

Figure 1:
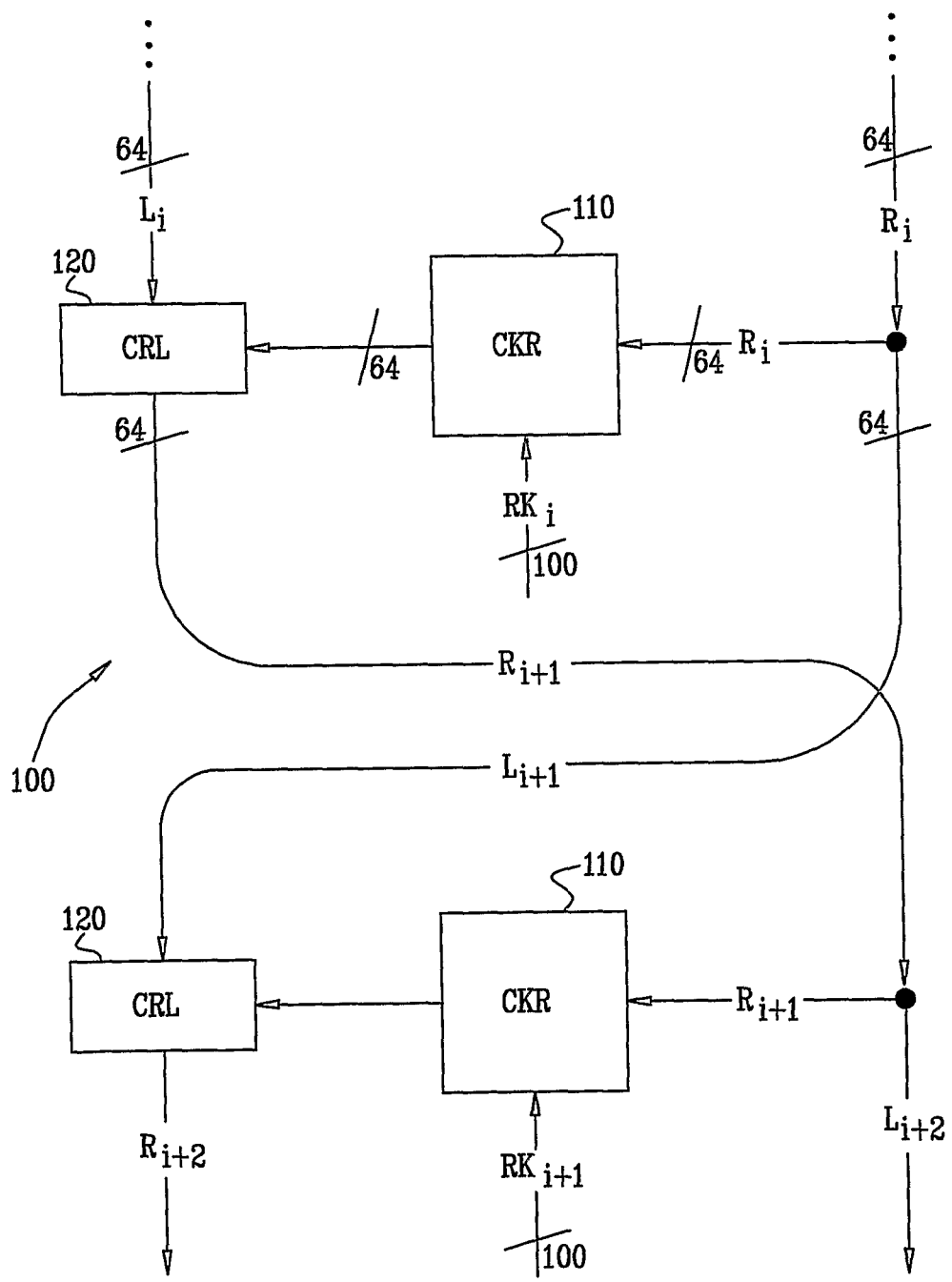
Figure 2:
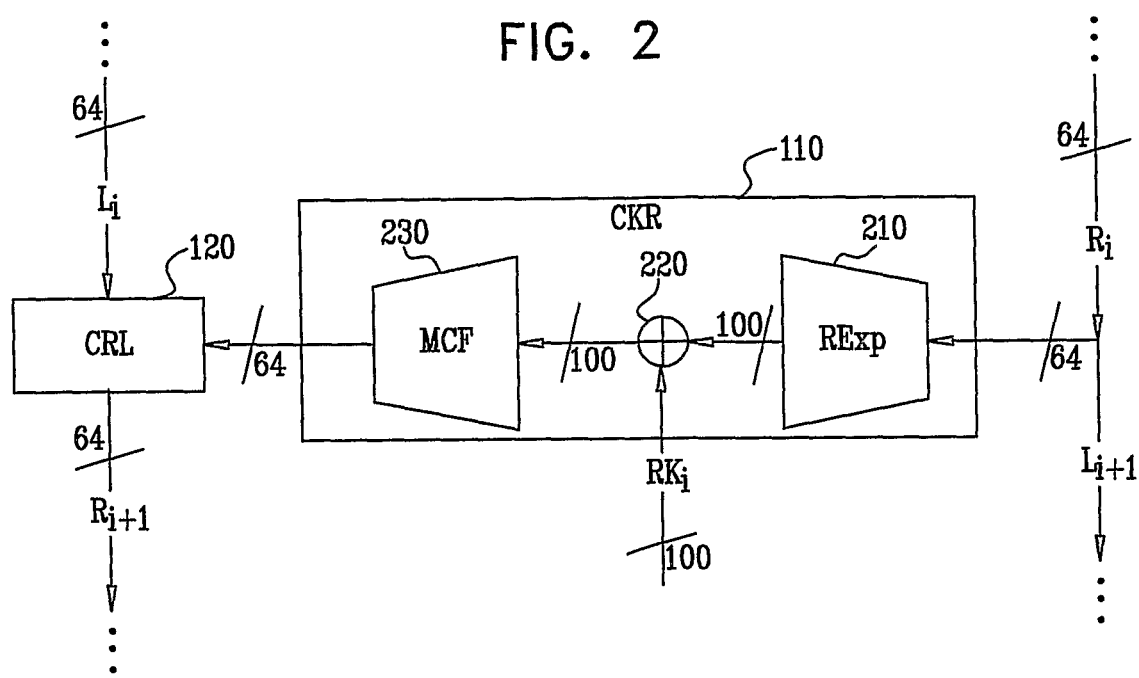
Figure 3:
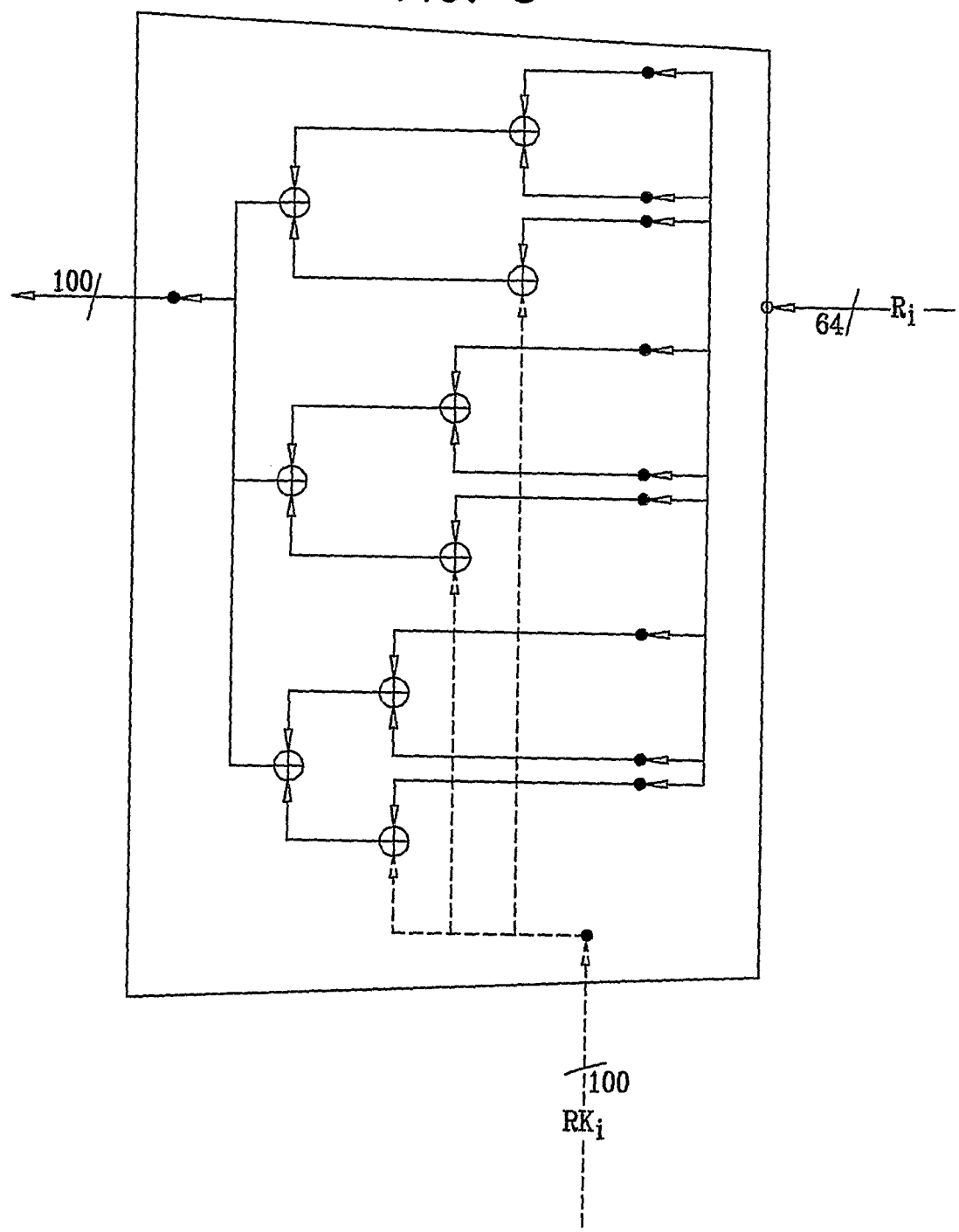
Figure 4:
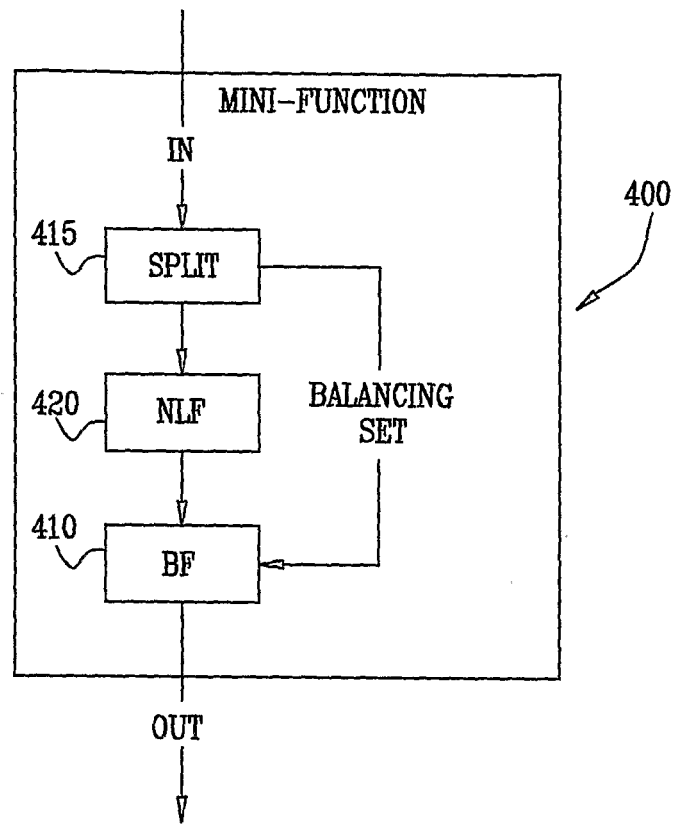
Figure 5:
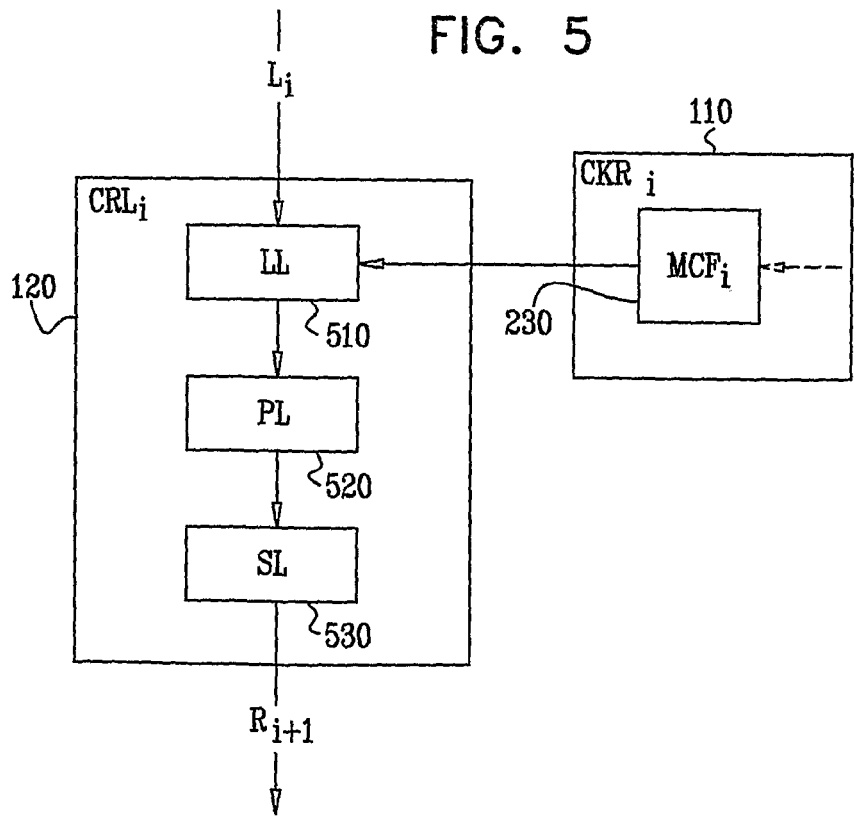
Figure 6:
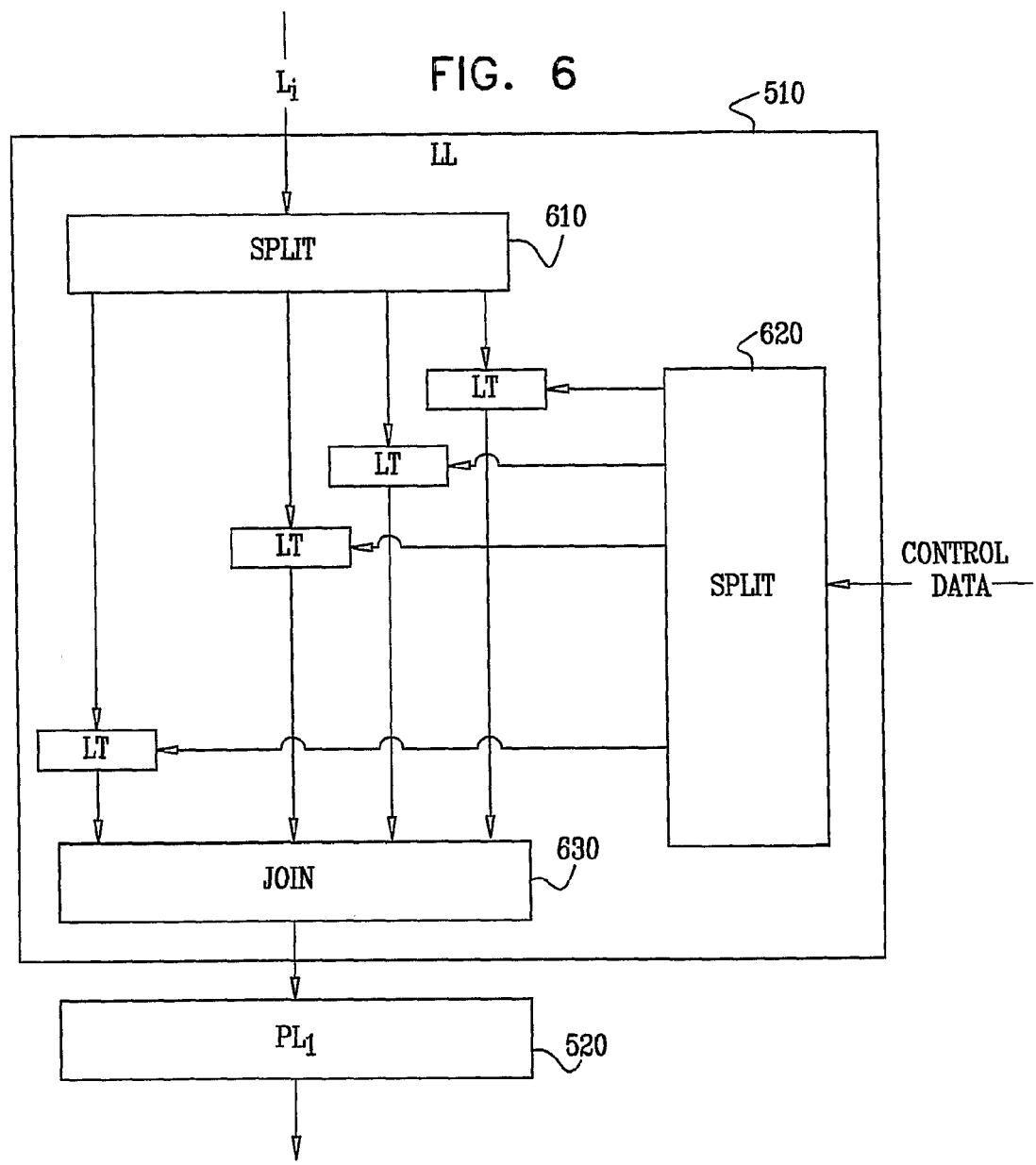
Figure 7:
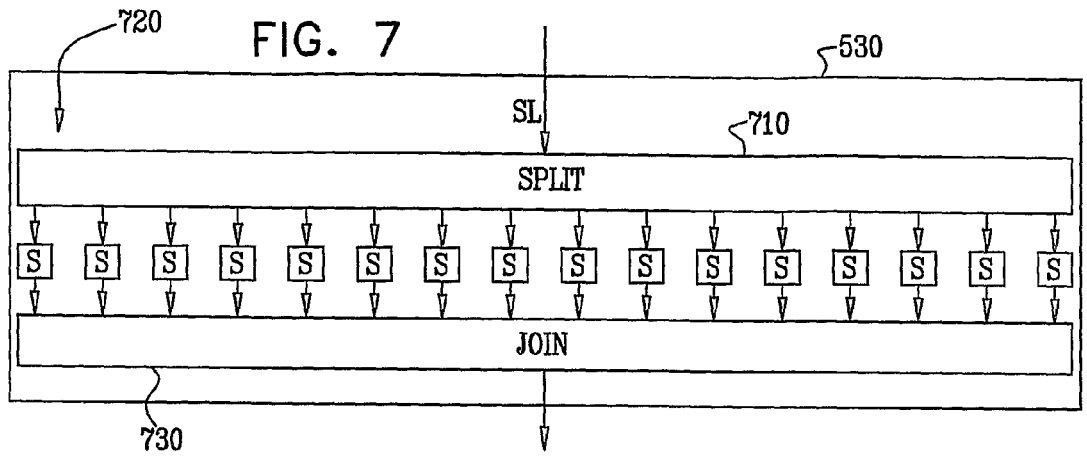
Figure 8:
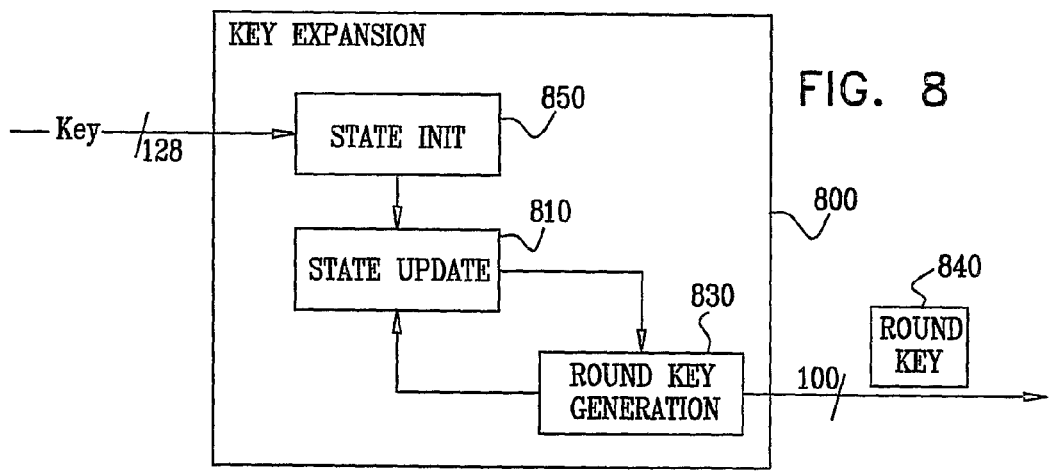
Figure 9:
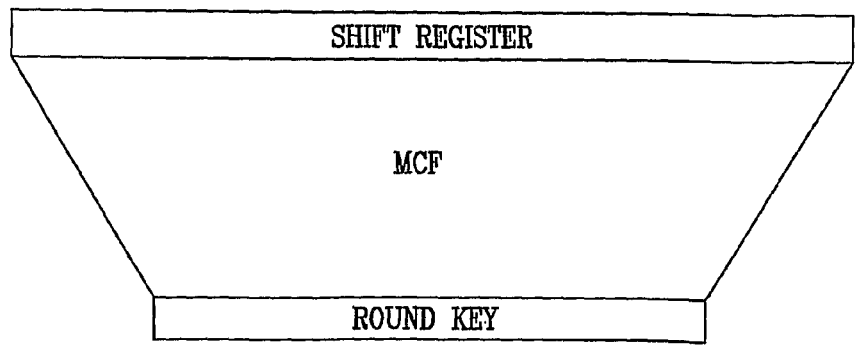
Figure 10:
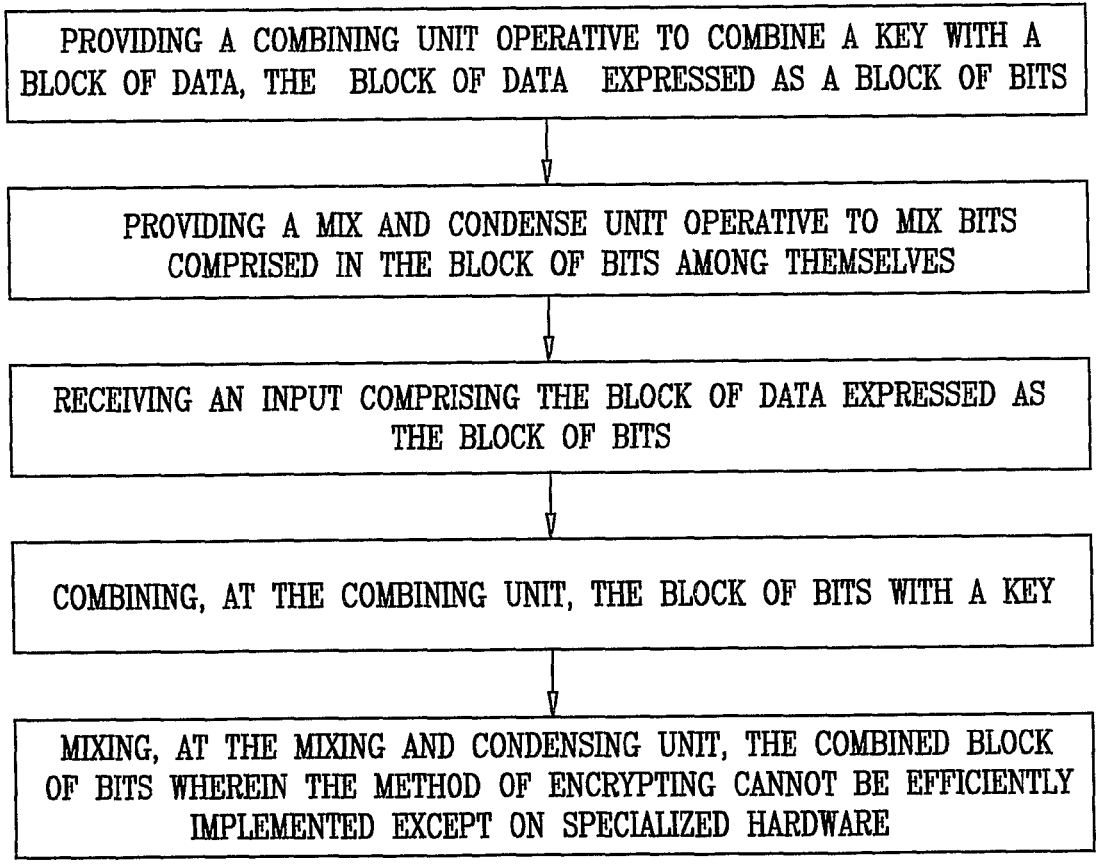
Figure 11:
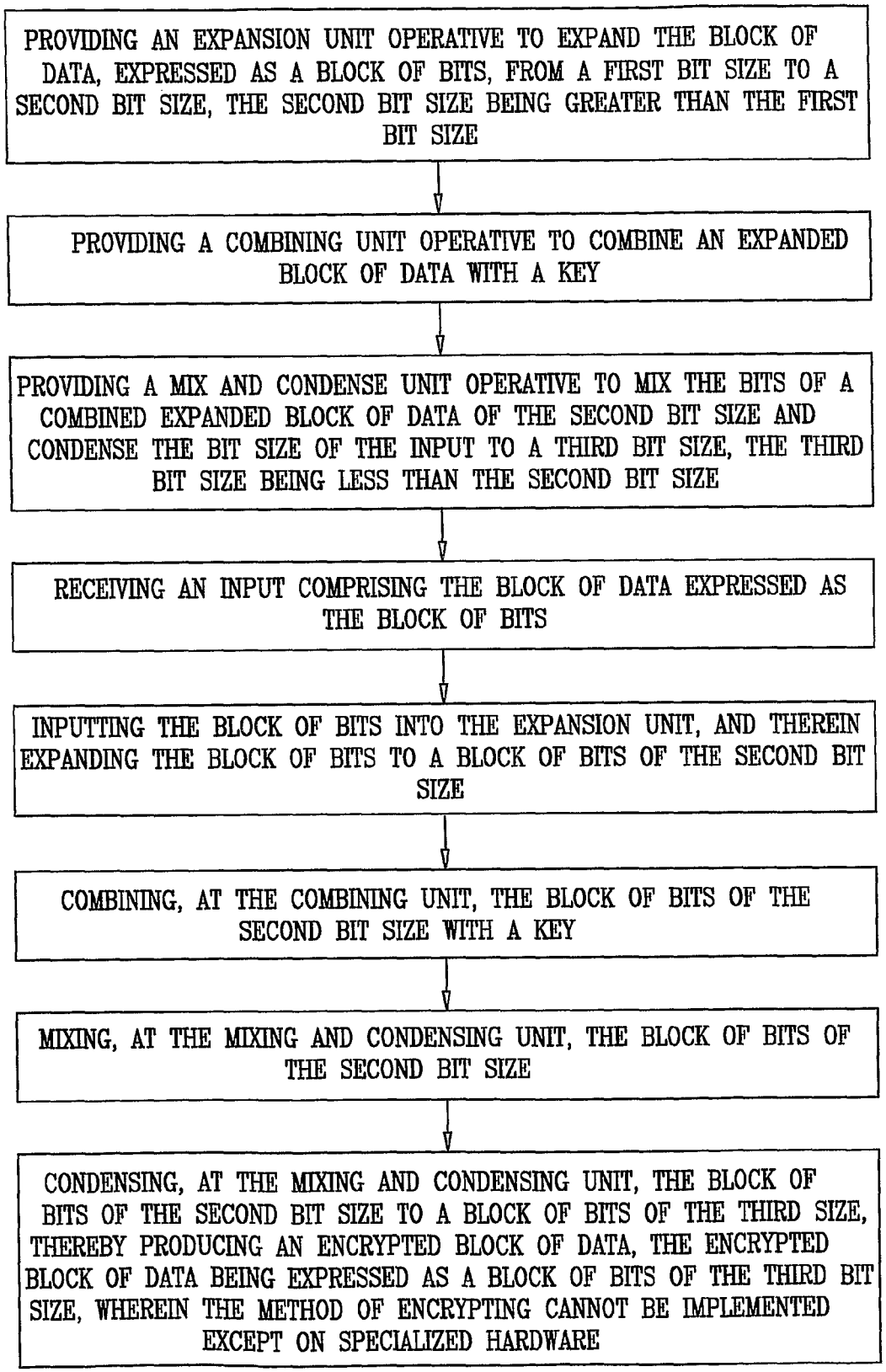
Figure 12:
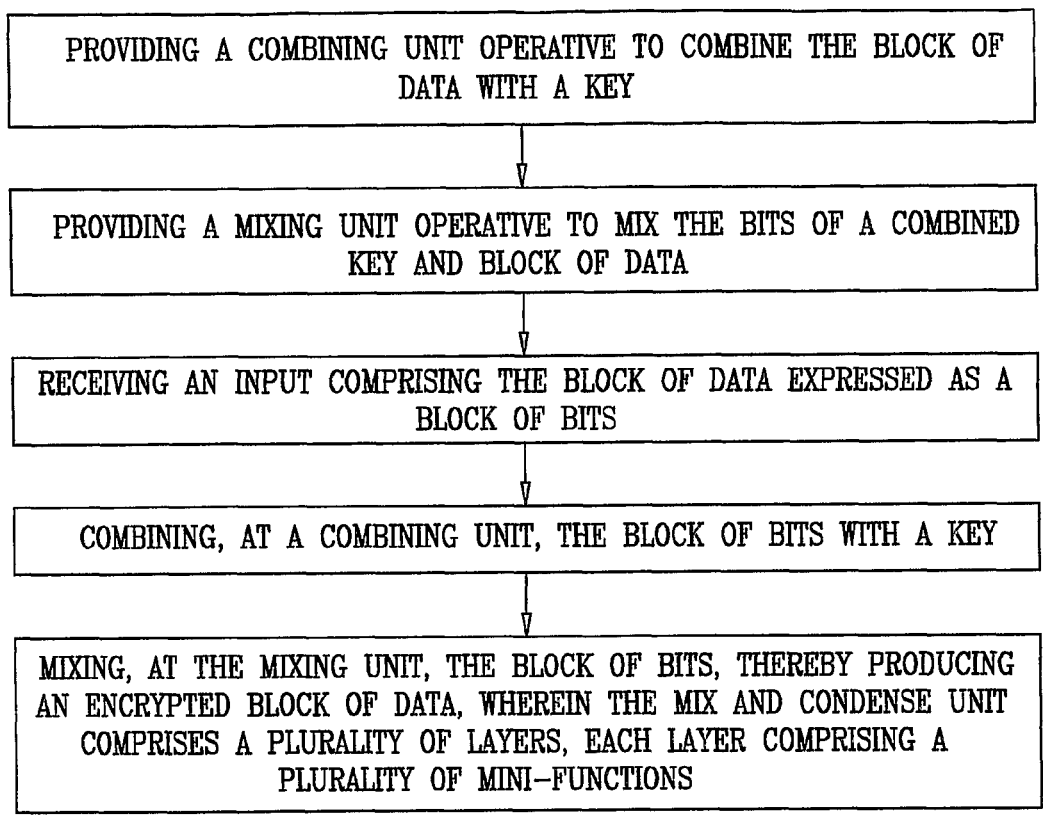
Figure 13:
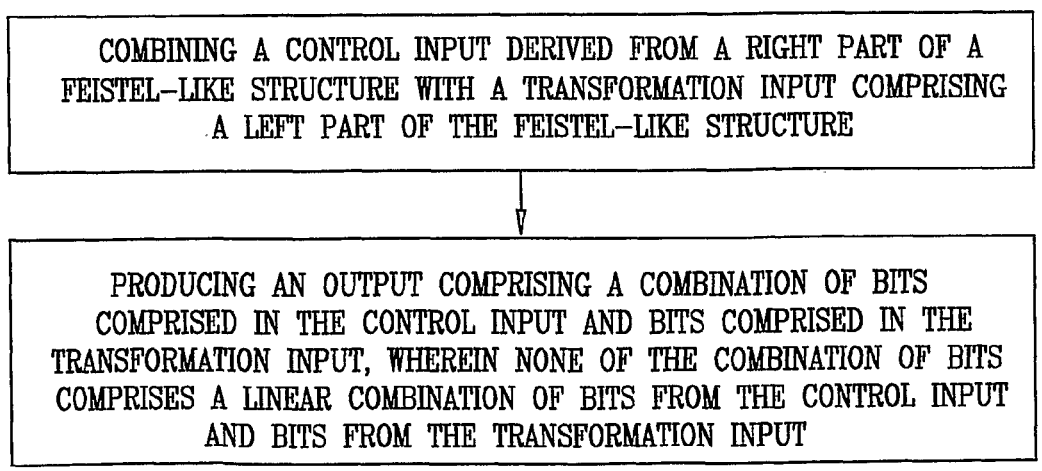

FIG. A-2 is a time line showing one preferred implementation of the relationship between key expansion and encryption rounds in a cipher designed according to the method of FIG. A-1;

FIG. A-3A is a simplified block diagram illustration depicting the use of MUX and DEMUX modules in a preferred implementation of the method of FIG. A-1;

FIG. A-3B is a simplified block diagram illustration of a preferred implementation of a round key generation function operative to generate round keys in a cipher designed according to the method of FIG. A-1;

FIG. A-4 is a simplified block diagram illustration of four rounds of a typical Feistel block cipher constructed and operative in accordance with the system of FIG. A-1;

FIG. A-5 is a simplified block diagram illustration of four rounds of a typical AES-like block cipher constructed and operative in accordance with the system of FIG. A-1;

FIG. A-6 is a simplified block diagram illustration of eight rounds of a typical Feistel block cipher constructed and operative in accordance with an alternative preferred embodiment of the system of FIG. A-1;

FIG. A-7 is a simplified block diagram illustration of eight rounds of a typical AES-like block cipher constructed and operative in accordance with an alternative preferred embodiment of the system of FIG. A-1;

FIG. A-8 is a simplified block diagram illustration of eight rounds of a typical Feistel block cipher constructed and operative in accordance with yet another alternative preferred embodiment of the system of FIG. A-1; and FIG. A-9 is a simplified block diagram illustration of eight rounds of a typical AES-like block cipher constructed and operative in accordance with yet another alternative preferred embodiment of the system of FIG. A-1.

DETAILED DESCRIPTION OF A PREFERRED EMBODIMENT

Reference is now made to FIG. A-1, which is a simplified block diagram illustration of a system 1010 for robust cipher design constructed and operative in accordance with a preferred embodiment of the present invention. The system 1010 of FIG. A-1 comprises different instances of a function F, depicted in round n as $F_a$ and $F_b$. In round n+1, the different instances of function F are depicted as $F_c$ and $F_d$.

The function F, in preferred embodiments thereof, preferably comprises at least one of:

a significant portion of cipher security (that is to say that if F is poorly selected, a cipher comprising F may be insecure); and a significant portion of hardware complexity of a typical hardware implementation of the cipher comprising F (the inventors of the present invention anticipate that at least 10% and preferably 20% of the gates in the hardware implementation of the cipher comprising F are dedicated to the function F, or at least 10% and preferably 20% of the voltage of the hardware implementation of the cipher comprising F is dedicated to the function F).

In preferred embodiments of a cipher comprising the function F, the function F, therefore, preferably comprises a significant portion of cipher security and comprises a significant portion of the hardware implementation of the cipher.

For example and without limiting the generality of the foregoing, the function F may preferably comprise a layer of S-boxes (well known cryptographic structures), such as the AES invertible 8-bit-to-8-bit S-boxes, or DES non-invertible 6-bit-to-4-bit S-boxes. Alternatively, the function F may comprise a linear transformation such as the AES ShiftRows transformation function, or the AES MixColumns transformation function.

Preferred methods of implementation of the present invention are discussed below with reference to FIGS. A-4-A-9.

The system of FIG. A-1 also comprises a round key generation function 1020, depicted in round n as comprising the first function, $F_a$, and later depicted in round n+11 as comprising the second function, $F_c$. The system of FIG. A-1 also comprises a round mixing function 1030, depicted in round n as comprising a third function, $F_b$, and later depicted in round n+1 as comprising a fourth function, $F_d$. $F_a$, $F_b$, $F_c$, and $F_d$ are preferably selected from among two functions, $F_i$ and $F_j$, thereby allowing implementation of only the two functions, $F_i$ and $F_j$ for the four functions, $F_a$, $F_b$, $F_c$, and $F_d$. In some preferred embodiment of the present invention, $F_b$ and $F_c$ are not identical, and thus can preferably be executed substantially simultaneously. That is, either $F_b=F_i$ and $F_c=F_j$, or $F_b F_j$ and $F_c=F_i$. In any event, the functions $F_a$ and $F_d$ can be either of functions $F_i$ or $F_j$.

The operation of the system of FIG. A-1 is now briefly described, making additional reference to FIG. A-2, which is a time line showing one preferred implementation of the relationship between key expansion (note that the terms "key expansion" and "key generation" are used interchangeably in the present disclosure and figures) and encryption rounds in a cipher designed according to the method of FIG. A-1. Prior to round 1, the round key generation function 1020 produces a round key for use by the round mixing function 1030 in round 1. Substantially in parallel to the operation of the round mixing function 1030 in round 1, the round key generation function 1020 produces a round key for use by the round mixing function 1030 in round 2. The process of the round key generation function 1020 producing a round key for use by the round mixing function 1030 in the next round continues substantially in parallel to the operation of the round mixing function 1030 until in round rounds number-1 (RN-1), the round key generation function 1020 produces a round key for use by the round mixing function 1030 in round RN. During round RN, there is no next round, and thus, while the round mixing function 1030 operates using the round key produced by the round key generation function 1020 during round RN-1, the round key generation function 1020 preferably does not generate a key.

The different instances of F, $F_a$ and $F_b$, are preferably implemented only once, preferably in hardware. It is appreciated that $F_a$ and $F_b$ may, under some circumstances, also be implemented in software.

Those skilled in the art will appreciate that implementing the functions $F_a$ and $F_b$ in hardware, instead of implementing a single function in hardware, requires additional gates in the hardware, and additional voltage in order to power the gates. In order to more efficiently implement the two instances of F, when $F_a$ is operating as part of round mixing function 1030, $F_b$ preferably is operating as part of the round key generation function 1020 for the next round. Similarly, when $F_b$ is operating as part of round mixing function 1030, $F_a$ preferably is operating as part of the round key generation function 1020 (FIG. A-1) for the next round.

Reference is now made to FIG. A-3A, which is a simplified block diagram illustration depicting the use of MUX and DEMUX modules in a preferred implementation of the method of FIG. A-1. In a preferred implementation of the present invention, a MUX module and a DEMUX module are preferably operative to differentiate between different sources for input, a key expansion input or an input as part of the round, as well as the different outputs, a register for round keys or a round key state register. The MUX modules are preferably updated by a counter (not depicted) which is operative to count rounds.

Hardware comprising key expansion logic 1310 outputs a temporal result to a first MUX module 1320. Similarly, hardware comprising round encryption logic 1330 outputs a temporal result to the first MUX module 1320. The first MUX module 1320, based on selection criteria 1340, determines if the output of the MUX module 1320 has to be a value taken as MUX input from the key expansion logic 1310 hardware or the value taken as MUX input from the round encryption logic 1330 hardware. A preferred implementation, given by way of example, relevant for the discussion below of FIGS. A-8 and A-9, of the selection criteria 1340 comprises a counter ranging in value from 0 to 3. If the counter value is 0 or 1, one option is implemented by the MUX module. If the counter value is 2 or 3, the second option is implemented by the MUX module. Output from the MUX module 1320 is preferably sent to $F_i$ as appropriate for a particular round. Output from $F_i$ is preferably input into a DEMUX module 1360. The DEMUX module 1360 preferably applies the selection criteria 1340 to determine if the received input needs to be preferably output as a round key generation temporal result 1370 to the key expansion logic 1310 hardware or as a round key mixing temporal result 1380 to the round encryption logic 1330 hardware.

In some preferred embodiments of the present invention, key expansion logic 1310 has a MUX component (not depicted) which selects between the round key generation temporal result 1370 of $F_i$ and the round key mixing temporal result 1380 of $F_j$. Similarly, in such preferred embodiments, the round encryption logic 1330 has a MUX component (not depicted) which selects between the round key generation temporal result 1370 of $F_j$ and the round key mixing temporal result 1380 of $F_i$.

A design similar to the system of FIG. A-3A comprises a preferred embodiment of MUX and DEMUX selection logic for $F_j$, where the selection criteria 1340 that is used for $F_j$ is preferably the negation of the selection logic that is used for $F_i$. That is, when the function $F_i$ is used for round key generation, function $F_j$ is preferably used for round key mixing, and vice-versa.

Those skilled in the art will appreciate that in addition to the benefit of added efficient use of voltage, a cipher designed as described herein also has additional security in that if, for instance, $F_j$ is found to be weak (for example and without limiting the generality of the foregoing, $F_j$ comprises linear properties; or $F_j$ comprises differential properties), $F_i$ still preferably gives some measure of protection to the cipher.

In some preferred embodiment of the present invention, the function F is deliberately designed to be inefficient in any implementation, except for an implementation comprising specialized hardware, thereby making a cipher comprising the function F inefficient in any implementation, except for an implementation comprising specialized hardware. Therefore, a cipher designed so as to comprise such an embodiment of the function F in $F_i$ and in $F_j$, $F_i$ being is inefficient, except for an implementation comprising specialized hardware, and $F_j$ not being inefficient in an implementation not comprising specialized hardware, comprises an implementation of the cipher which is still, substantially inefficient except for an implementation comprising specialized hardware.

In order to differentiate between multiple usages of $F_i$ (in the round mixing function 1030 (FIG. A-1) and in the round key generation function 1020 (FIG. A-1)), constant round vectors may preferably be used in order to affect the behavior of function $F_i$. Similarly, in order to differentiate between multiple usages of $F_j$ (in the round mixing function 1030 (FIG. A-1) and in the round key generation function 1020 (FIG. A-1)), constant round vectors may preferably be used in order to affect the behavior of function $F_j$. Constant round vectors may preferably be used for at least one of two purposes:

1. allowing more versions of F than are implemented in hardware (for instance, implement $F_i$ and $F_j$, and use different constant vectors during different rounds in order to increase differences in outputs of different rounds); and 2. differentiating between usage of either $F_i$ or $F_j$ as a round operation and using $F_i$ and $F_j$ as a key expansion operation by using a different constant round vector during key expansion than during the round operation.

The use of functions $F_i$ and $F_j$ as part of the round key generation function and as part of the round mixing function in cipher design is now discussed. Reference is now made to FIG. A-3B, which is a simplified block diagram illustration of a preferred implementation of a round key generation function operative to generate round keys in a cipher designed according to the method of FIG. A-1. $F_i$ and $F_j$ may comprise either invertible functions or non-invertible functions, as appropriate, depending on the cipher in which functions $F_i$ and $F_j$ are implemented, and on the stage of implementing the cipher in which functions $F_i$ and $F_j$ are implemented. As will be discussed below with reference to FIGS. A-4, A-6, and A-8, in Feistel based encryption schemes, such as DES, $F_i$ and $F_j$ (as part of the key mixing mechanism) preferably comprise a part of the combination of the round key with "right" half, prior to combining (XORing in DES) with the "left" half (a non-invertible operation). In such a cipher, functions $F_i$ and $F_j$ are preferably implemented as non-invertible functions. Alternatively and preferably, as described below with reference to FIGS. A-5, A-7, and A-9, in substitution permutation ciphers such as the AES cipher (FIPS197), $F_i$ and $F_j$ preferably comprise part of the round function. In such a cipher, functions $F_i$ and $F_j$ are preferably implemented as invertible functions.

The round key generation function 1327 operates iteratively in order to generate a plurality of keys. The iterative operation of round key generation function 1327 comprises a state, R. The state R is initialized by executing a function, StateInit 1337, with root key K as input during every round. R is updated by a State Update function 1347. The State Update function 1347 is applied to the state from the previous round in order to update R for the round. A Round Key Generation function 1357 generates a new round key $RK_i$ 1367 from the updated value of R. Thus, round keys $RK_1$ through $RK_{RN}$ (RN=round number, the number of rounds, as described above) are generated from root key K according to the following method:

$R_0$=InitState(K)
For i=1 to RN
$R_i$=StateUpdate($R_{i-1}$)
$RK_i$=RoundKeyGenerate($R_i$)

In preferred embodiments of the present invention, the size of the state R is preferably equal to the size of the key. For example and without limiting the generality of the foregoing, if the key is 128 bits, the state R is preferably 128 bits.

One preferred method of determining the state during the iterative process described above, applicable when RN is less than the size of the key in bits, comprises initializing an L-bit state with an L-bit key K, and circularly shifting the L bit key one bit each round. In such a method of determining the state, RoundKeyGenerate 1357 need not be an invertible function.

In preferred implementations where $F_i$ and $F_j$ comprise non-invertible functions, and the round key generation function is designed as described above, non-invertible function F preferably comprises a portion of the RoundKeyGenerate 1357 function. In preferred implementations where $F_i$ and $F_j$ comprise invertible functions, and the round key generation function is designed as described above, the StateUpdate 1347 function is preferably invertible, and invertible function F preferably comprises a portion of the StateUpdate 1347 function.

Non-limiting examples of different preferred implementations of the present invention are now described.

Reference is now made to FIG. A-4, which is a simplified block diagram illustration of four rounds of a typical Feistel block cipher 1400 constructed and operative in accordance with the system of FIG. A-1. It is appreciated that FIG. A-4 provides an illustration of data structures and methods for implementing an encryption network, the illustration being drawn in a format which is well known in the art.

The Feistel block cipher 1400 comprises round mixing function designated hereinafter as function A 1420 and function B 1430. Additionally, a combine function 1440, depicted in FIG. A-1 as ⊕, XOR (exclusive OR), combines the output of either of function A 1420 or of function B 1430 with an input. Even though the combine function 1440 is depicted as XOR, it is appreciated that any appropriate combining function may be implemented to combine the output of either of function A 1420 or of function B 1430 with the input.

The operation of the system of FIG. A-4 is now described. As is well known in the art, block ciphers typically are applied in an iterative fashion, an iteration of the cipher being referred to as a "round". A function which is repeated during each round is typically referred to as a "round function". Frequently, the round function comprises several sub-functions.

For example and without limiting the generality of the foregoing, the well known in the art DES block cipher (a Feistel cipher) round function comprises four stages, each stage executed in an appropriate sub-function:

1. Expansion, in which a 32-bit input block is expanded to 48 bits;
2. Key mixing, in which a 48-bit output of the expansion is combined, using a XOR function, with a round key 1450, the round key 1450 being specific to a specific round;
3. Substitution, in which an output of the key mixing function is subdivided into 8 6-bit sub-blocks. Each of the 8 6-bit sub-blocks is input into a substitution box ("S-box"), which, according to a non-linear transformation, outputs a 4-bit block, thereby producing a total of 32 output bits; and
4. Permutation, in which the 32 output bits of the substitution are rearranged according to a fixed permutation, the "P-box".

In certain preferred embodiments of the present invention, a function, F, operative as a sub-function comprised in the round function of the block cipher 1410 is replaced with different instances of F: $F_i$ and $F_j$. During different rounds of the block cipher 1410, the different instances of F ($F_i$ and $F_j$), are used. Thus, in the preferred embodiment of the present invention depicted in FIG. A-4, function A 1420, comprising function $F_i$, and function B 1430, comprising function $F_j$, are used in alternate rounds.

Since the round encryption function preferably uses a round key generated during a previous round, it is appreciated that during rounds when function A 1420, comprising function $F_i$, comprises the round mixing function, $F_j$ is preferably used in the round key generation function to generate the round key for the next round. During rounds when function B 1430, comprising function $F_j$, comprises the round mixing function, $F_i$ is preferably used in the round key generation function to generate the round key for the next round.

In the cipher depicted in FIG. A-4, each sequence of rounds comprises ABAB . . . , such that each round alternates the use of the implementation of F ($F_i$, $F_j$, $F_i$, $F_j$, . . . ). In such a preferred implementation, key expansion preferably comprises XBABA . . . , where a first round uses a key, X, that can be derived either from A or B. Thus, the following table describes the preferred implementation depicted in FIG. A-4:

| Round | Key Generation | Round Function |
|-------|----------------|----------------|
| 1 | X | $F_i$ |
| 2 | $F_j$ | $F_j$ |
| 3 | $F_i$ | $F_i$ |
| 4 | $F_j$ | $F_j$ |
| 5 | $F_i$ | $F_i$ |

Reference is now made to FIG. A-5, which is a simplified block diagram illustration of four rounds of a typical AES-like block cipher 1500 constructed and operative in accordance with the system of FIG. A-1. Each round of the AES-like block cipher comprises a round key generation function 1510 (for ease of depiction, "key setup", in FIG. A-5) operative to provide the round key to the round mechanism 1520. Each round mechanism 1520 typically comprises a key mixing function 1530 (for ease of depiction, "key comb", in FIG. A-5), which is operative to receive the key from the round key generation function 1510, and combine, typically using a XOR function, the key with a known constant. Output from the key mixing function 1530 is typically input into a linear layer 1540. The linear layer 1540 typically comprises functions well known in the art, such as "MixRows" and "Shift-Columns". Output from the linear layer 1540 is typically input into a non-linear layer 1550. The non-linear layer 1550 typically comprises S-boxes. Additionally, in preferred embodiments of the present invention, the non-linear layer 1550 comprises an implementation of the function F, either $F_i$ or $F_j$. In the preferred implementation of the present invention depicted in FIG. A-5, implementations of $F_i$ or $F_j$ alternate, similar to the preferred implementation depicted in FIG. A-4.

Reference is now made to FIG. A-6, which is a simplified block diagram illustration of eight rounds of a typical Feistel block cipher constructed and operative in accordance with an alternative preferred embodiment of the system of FIG. A-1. Reference is additionally made to FIG. A-7, which is a simplified block diagram illustration of eight rounds of a typical AES-like block cipher constructed and operative in accordance with an alternative preferred embodiment of the system of FIG. A-1.

The operation of the systems depicted in FIG. A-6 is described above with reference to FIG. A-4, and the operation of the systems depicted in FIG. A-7 is described above with reference to FIG. A-5.

In the ciphers depicted in FIGS. A-6 and A-7, each sequence of several rounds first comprises function $F_i$ in the round mixing function and comprises the function $F_j$ in the round key generation function. Then, after the sequence of several rounds, functions $F_i$ and $F_j$ switch roles, and function $F_i$ is comprised in the round key generation function, and function $F_j$ is comprised in the round mixing function. Thus, the following table describes the preferred implementation depicted in FIGS. A-6 and A-7:

| Round | Key Generation | Round Function |
|---|---|---|
| 1 | X | $F_i$ |
| 2 | $F_j$ | $F_i$ |
| ... | $F_j$ | $F_i$ |
| n | $F_j$ | $F_i$ |
| n + 1 | $F_j$ | $F_i$ |
| n + 2 | $F_j$ | $F_j$ |
| n + 3 | $F_i$ | $F_j$ |
| ... | $F_i$ | $F_j$ |
| n + m | $F_i$ | $F_j$ |
| n + m + 1 | $F_i$ | $F_j$ |
| n + m + 2 | $F_i$ | $F_j$ |

Reference is now made to FIG. A-8, which is a simplified block diagram illustration of eight rounds of a typical Feistel block cipher constructed and operative in accordance with yet another alternative preferred embodiment of the system of FIG. A-1. Reference is additionally made to FIG. A-9, which is simplified block diagram illustration of eight rounds of a typical AES-like block cipher constructed and operative in accordance with yet another alternative preferred embodiment of the system of FIG. A-1.

The operation of the systems depicted in FIG. A-8 is described above with reference to FIG. A-4, and the operation of the systems depicted in FIG. A-9 is described above with reference to FIG. A-5.

In the ciphers depicted in FIGS. A-8 and A-9, two rounds comprise function $F_i$ in the round key generation function and comprise the function $F_j$ in the round mixing function. Then, after the two rounds, functions $F_i$ and $F_j$ switch roles, and for the next two rounds, function $F_i$ is comprised in the round key generation function, and function $F_j$ is comprised in the round mixing function. Thus, the following table describes the preferred implementation depicted in FIGS. A-8 and A-9:

| Round | Key Generation | Round Key |
|---|---|---|
| 1 | X | $F_i$ |
| 2 | $F_j$ | $F_i$ |
| 3 | $F_j$ | $F_j$ |
| 4 | $F_i$ | $F_j$ |
| 5 | $F_i$ | $F_i$ |

It is appreciated that input into the ciphers and rounds therein described above may comprise preprocessing. Furthermore, output of the ciphers and rounds therein may comprise postprocessing.

It is appreciated that software components of the present invention may, if desired, be implemented in ROM (read only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

APPENDIX B

The following are S-boxes $S_0$ through $S_7$, as listed in Appendix A.5 of the Serpent Cipher specification (www.ftp.cl.cam.ac.uk/ftp/users/rja14/serpent.pdf):

| | | | | | | | | | | | | | | | | |
|---|---|---|---|---|---|---|---|---|---|---|---|---|---|---|---|---|
| $S_0$ | 3 | 8 | 15 | 1 | 10 | 6 | 5 | 11 | 14 | 13 | 4 | 2 | 7 | 0 | 9 | 12 |
| $S_1$ | 15 | 12 | 2 | 7 | 9 | 0 | 5 | 10 | 1 | 11 | 14 | 8 | 6 | 13 | 3 | 4 |
| $S_2$ | 8 | 6 | 7 | 9 | 3 | 12 | 10 | 15 | 13 | 1 | 14 | 4 | 0 | 11 | 5 | 2 |
| $S_3$ | 0 | 15 | 11 | 8 | 12 | 9 | 6 | 3 | 13 | 1 | 2 | 4 | 10 | 7 | 5 | 14 |

-continued

| | | | | | | | | | | | | | | | | |
|---|---|---|---|---|---|---|---|---|---|---|---|---|---|---|---|---|
| $S_4$ | 1 | 15 | 8 | 3 | 12 | 0 | 11 | 6 | 2 | 5 | 4 | 10 | 9 | 14 | 7 | 13 |
| $S_5$ | 15 | 5 | 2 | 11 | 4 | 10 | 9 | 12 | 0 | 3 | 14 | 8 | 13 | 6 | 7 | 1 |
| $S_6$ | 7 | 2 | 12 | 5 | 8 | 4 | 6 | 11 | 14 | 9 | 1 | 15 | 13 | 3 | 10 | 0 |
| $S_7$ | 1 | 13 | 15 | 0 | 14 | 8 | 2 | 11 | 7 | 4 | 12 | 10 | 9 | 3 | 5 | 6 |

The following are inverse S-boxes $InvS_0$ through $InvS_7$, as listed in Appendix A.5 of the Serpent Cipher specification, for use in decryption:

| | | | | | | | | | | | | | | | | |
|---|---|---|---|---|---|---|---|---|---|---|---|---|---|---|---|---|
| $InvS_0$ | 13 | 3 | 11 | 0 | 10 | 6 | 5 | 12 | 1 | 14 | 4 | 7 | 15 | 9 | 8 | 2 |
| $InvS_1$ | 5 | 8 | 2 | 14 | 15 | 6 | 12 | 3 | 11 | 4 | 7 | 9 | 1 | 13 | 10 | 0 |
| $InvS_2$ | 12 | 9 | 15 | 4 | 11 | 14 | 1 | 2 | 0 | 3 | 6 | 13 | 5 | 8 | 10 | 7 |
| $InvS_3$ | 0 | 9 | 10 | 7 | 11 | 14 | 6 | 13 | 3 | 5 | 12 | 2 | 4 | 8 | 15 | 1 |
| $InvS_4$ | 5 | 0 | 8 | 3 | 10 | 9 | 7 | 14 | 2 | 12 | 11 | 6 | 4 | 15 | 13 | 1 |
| $InvS_5$ | 8 | 15 | 2 | 9 | 4 | 1 | 13 | 14 | 11 | 6 | 5 | 3 | 7 | 12 | 10 | 0 |
| $InvS_6$ | 15 | 10 | 1 | 13 | 5 | 3 | 6 | 0 | 4 | 9 | 14 | 7 | 2 | 12 | 8 | 11 |
| $InvS_7$ | 3 | 0 | 6 | 13 | 9 | 14 | 15 | 8 | 5 | 12 | 11 | 7 | 10 | 1 | 4 | 2 |

APPENDIX C

Method and System for Block Cipher Encryption

FIELD OF THE INVENTION

The present invention relates to methods of encryption, and more particularly, to Feistel based block cipher methods of encryption

BACKGROUND OF THE INVENTION

Many encryption methods are known in the art. Of the known methods, many methods are block methods in which a block of plain text is iteratively altered according to a predefined rule; each such iteration is also known as a "round".

Many block encryption methods can be viewed as specific cases of Feistel networks, also termed herein "Feistel cipher methods", or "Feistel-like cipher methods"; a single round of a Feistel cipher method is termed herein a "Feistel cipher round".

Feistel ciphers are defined in the *Handbook of Applied Cryptography* (A. Menezes, P. van Oorschot, and S. Vanstone, CRC Press, 1996. The *Handbook of Applied Cryptography* (HAC) is available on the Internet at www.cacr.math.uwaterloo.ca/hac). The discussion of Feistel ciphers in HAC, on pages 250-259, is incorporated herein by reference.

A Feistel cipher is an iterated block cipher mapping a plaintext (comprising two parts, $L_0$ and $R_0$, for t-bit blocks $L_0$ and $R_0$, to a ciphertext ($R_r$ and $L_r$), through an r-round process where $r \geq 1$. For $1 \leq i \leq r$, round I maps ($L_{i-1}$, $R_{i-1}$) using key $K_i$ to ($L_i$, $R_i$) as follows: $L_i = R_{i-1}$, $R_i = L_{i-1} \oplus f(R_{i-1}, K_i)$, where each subkey $K_i$ is derived from the cipher key K (HAC, page 251).

Those skilled in the art will appreciate that although the definition above is for blocks $L_0$ and $R_0$ of equal sizes, equality of the sizes is not mandatory.

Decryption of a Feistel cipher is often achieved using the same r-round process but with subkeys used in reverse order, $K_r$ through $K_1$.

Types of block ciphers which are cases of Feistel networks include the following well-known methods: DES, Lucifer, FEAL, Khufu, Khafre, LOKI, GOST, CAST, and Blowfish.

Feistel ciphers are also discussed in *Applied Cryptography, Second Edition* (B. Schneier, John Wiley and Sons, Inc., 1996) on pages 347-351. The discussion of Feistel ciphers in *Applied Cryptography, Second Edition* is hereby incorporated herein by reference.

DES is specified in FIPS 46-3, available on the Internet at: csrc.nist.gov/publications/fips/fips46-3/fips46-3.pdf. FIPS 46-3 is hereby incorporated herein by reference.

FOX: A New Family of Block Ciphers, (Pascal Junod and Serge Vaudenay, *Selected Areas in Cryptography* 2004: *Waterloo, Canada, Aug. 9-10, 2004. Revised papers, Lecture Notes in Computer Science*. Springer-Verlag.) describes the design of a new family of block ciphers based on a Lai-Massey scheme, named FOX. The main features of the design, besides a very high security level, are a large implementation flexibility on various platforms as well as high performances. In addition, a new design of strong and efficient key-schedule algorithms is proposed. Evidence is provided that FOX is immune to linear and differential cryptanalysis.

How to Construct Pseudorandom Permutations From Pseudorandom Functions (M. Luby and C. Rackoff, SIAM Journal on Computing, 17:2, pp. 373—386, April 1988), describes a method to efficiently construct a pseudorandom invertible permutation generator from a pseudorandom function generator. A practical result described in Luby-Rackoff is that any pseudorandom bit generator can be used to construct a block private key cryptosystem which is secure against chosen plaintext attacks, which is one of the strongest known attacks against a cryptosystem.

The disclosures of all references mentioned above and throughout the present specification, as well as the disclosures of all references mentioned in those references, are hereby incorporated herein by reference.

SUMMARY OF THE INVENTION

The present invention seeks to provide an improved encryption method, and in particular an improved encryption method related to Feistel encryption methods. A Feistel-like cipher, described herein, is preferably designed to be easily implemented in hardware and difficult to implement in software.

There is thus provided in accordance with a preferred embodiment of the present invention an improved Feistel-like cipher using a P-box in less than all rounds of the Feistel-like cipher.

Further in accordance with a preferred embodiment of the present invention the P-box is used in every second round of the Feistel-like cipher.

There is also provided in accordance with another preferred embodiment of the present invention a Feistel-like cipher using a full-size key and at least one reduced-size intermediate key, such that a size of the reduced-size intermediate key is chosen so that implementation of the Feistel-like cipher without specialized hardware is inefficient.

Further in accordance with a preferred embodiment of the present invention the size of the intermediate key in bits is not a power of two (2).

Still further in accordance with a preferred embodiment of the present invention the size of the intermediate key in bits is eighty nine (89).

Additionally in accordance with a preferred embodiment of the present invention plaintext inputs are not of equal size.

There is also provided in accordance with a still another preferred embodiment of the present invention a multi-round Feistel-like cipher using a first P-box and a second P-box, such that the first P-box is used on a first half of an input, and the second P-box is used on a second half of the input, after the second half input has been modified in a round of the Feistel-like cipher

BRIEF DESCRIPTION OF THE DRAWINGS

The present invention will be understood and appreciated more fully from the following detailed description, taken in conjunction with the drawings in which:

FIG. C-1 is an illustration of a hardened Feistel-like structure constructed and operative in accordance with a preferred embodiment of the present invention;

FIG. C-2 is an illustration of an alternative preferred embodiment of the hardened Feistel-like structure of FIG. C-1;

FIG. C-3 is a simplified block diagram of a preferred implementation of a MixKey function of the system of FIG. C-1; and FIG. C-4 is a simplified block diagram of a CombParts function of the system of FIG. C-1.

DETAILED DESCRIPTION OF A PREFERRED EMBODIMENT

Reference is now made to FIG. C-1, which is an illustration of a hardened Feistel-like structure constructed and operative in accordance with a preferred embodiment of the present invention. It is appreciated that FIG. C-1 provides an illustration of data structures and methods for implementing an encryption network, the illustration being drawn in a format which is well known in the art. Persons skilled in the art will appreciated that, as discussed below with reference to FIG. C-4, the data structures and methods of the illustrated encryption network may be implemented in special purpose hardware, in software combined with general purpose hardware, or in any appropriate combination thereof. The present invention encompasses implementations using any such appropriate implementation.

FIG. C-1 depicts two rounds of the hardened Feistel-like structure 2100, it being appreciated that a plurality of rounds comprising more than two rounds is preferred, similarly to the plurality of rounds known in the prior art in the case of Feistel-like networks.

In each round of the hardened Feistel-like structure 2100, two halves of a plaintext, left and right, depicted as L and R, are operated on by a MixKey function 2110 and a CombParts function 2120. A preferred method of operation of the MixKey function 2110 is discussed below with reference to FIG. C-3, and a preferred method of operation of the CombParts function 2120 is discussed below with reference to FIG. C-4. It is appreciated that in each round, L and R preferably have an identical size of 64 bits. It is appreciated that L and R may be any equal size, and 64 bits is used herein as an example.

It is appreciated that the plurality of rounds may preferably be preceded by preprocessing of L and R. For example L and R may preferably be permuted according to a pre-defined permutation in the same manner the DES block cipher permutes the input before the first round (refer to FIPS 46-3). It is further appreciated that after the plurality of rounds are completed, an encrypted output of the hardened Feistel-like structure 2100 may be post-processed. For example, output may preferably be further permuted according to a pre-defined permutation in the same manner the DES block cipher permutes the state after the $16^{th}$ round (refer to FIPS 46-3).

In addition, a first round of the hardened Feistel-like structure 2100 and a last round, and other round of the hardened Feistel-like structure 2100 may preferably differ from each other and from other rounds among the plurality of rounds.

After every at least two rounds, L and R are input into a Permutation-box 2130 (P-box). It is appreciated that L and R can be input into the P-box 2130 after every round. However, because of the nature of the Feistel-like structure 2100, such a solution is less secure than a solution where L and R are input into the P-box 2130 every two or more rounds. Those skilled in the art will appreciate that input into the P-box 2130 every round may result in several bits left unchanged for at least two rounds. Therefore, input into the P-box 2130 after two or more rounds is a more secure implementation of the Feistel-like structure 2100.

In some preferred embodiment of the present invention, R may optionally not be input into the P-box 2130.

P-boxes are well known cryptographic structures. Typically, P-boxes are used to introduce permutations into ciphertext messages. P-box 2130 preferably comprises a bit permutation routine which preferably:

concatenates L and R;
permutes the bits comprising L and R;
produces a result of the permutation; and
splits the result into the next iteration of L and R.

It is appreciated that implementing the P-box 2130 every two rounds makes the Feistel-like structure 2100 harder to implement in software.

In a preferred embodiment of the present invention, between 20 and 50 rounds are implemented. The exact number of rounds depends on the operation of a function, described with reference to FIG. C-3, as the Reduce function.

In one preferred implementation of the present invention, a 128 bit key (not shown) is preferably used to generate a plurality of round keys 2190, where each round key 2190 is used in one Feistel round. A typical number of rounds is 46. Round key 2190 generation is preferably done through a key expansion algorithm such as the KS128 algorithm (described in "FOX: A New Family of Block Ciphers", P. Junod and S. Vaudenay, SAC 2004). Each round key 2190 may comprise 100 bits, 146 bits, or any other appropriate bit size.

Reference is now made to FIG. C-2, which is an illustration of an alternative preferred embodiment of the hardened Feistel-like structure 2100 of FIG. C-1. In the alternative preferred embodiment of the hardened Feistel-like structure 2100 depicted in FIG. C-2, the hardened Feistel-like structure 2100 is implemented as in FIG. C-1. However, rather than inputting L and R into the P-box 2130 (FIG. C-1), the output of the CombParts function 2120 is input into P-box $PL_i$ 2160, and $R_i$ is optionally input into P-box $PR_i$ 2170. Both $PL_i$ 2160 and $PR_i$ 2170 are permutations of $\{1, \ldots, 64\}$.

As had been proven in Luby and Rackoff, (How to Construct Pseudorandom Permutations from Pseudorandom Functions, SIAM Journal on Computing, 17:2, pp. 373-386, April 1988) assuming that the MixKey functions are pseudorandom, Feistel-like structures that employ a XOR operator as the CombParts operator provide pseudo-random functions. Those skilled in the art will appreciate that replacement of the XOR operation with a different CombParts operator will preserve the correctness of the proof. Applying a P-box after every two or more rounds has not yet been proven to be secure.

Reference is now made to FIG. C-3, which is a simplified block diagram of a preferred implementation of the MixKey function 2110 of the system of FIG. C-1. The MixKey function 2110 preferably integrates the round key 2230 with the 64 bit right half in order to generate a 64 bit input to the CombParts function 2120.

In some preferred embodiments of the present invention, a plurality of different instances of the MixKey function 2110 are implemented. For example and without limiting the generality of the foregoing, after a first instance of the MixKey function 2110 has been used for several rounds, a second instance of the MixKey function 2110 is used for several rounds, and so forth. As an alternative and non-limiting example of implementing different instances of the MixKey function 2110, instances may be implemented cyclically. For instance, if there are three different instance of the MixKey function 2110, the MixKey function 2110 may be implemented by first using a first instance of the MixKey function 2110, then using a second instance of the MixKey function 2110, and then using a third instance of the MixKey function 2110. After the third instance of the MixKey function 2110 is used, the first instance is used again, and so forth, in a cyclical fashion. It is appreciated that in the previous example three different implementations the MixKey function 2110 were mentioned by way of example, and any other appropriate number of implementations of the MixKey function 2110 may be used.

The MixKey function 2110 preferably comprises three subfunctions:
 RExpansion 2210;
 CombKey 2220; and
 Reduce 2240.

Implementations of the MixKey function 2110 may differ by using different instances of the three subfunctions RExpansion 2210, CombKey 2220, and Reduce 2240.

RExpansion 2210 preferably expands the right half of the plaintext, R to 89 bits. Those skilled in the art will appreciate that outputting 89 bits by RExpansion 2210 is a deliberate choice, in that 89 is not a power of 2. Therefore, encryption and decryption is more difficult in software than in hardware. It is also appreciated that any other size may be used for the size of the output of RExpansion 2210, however, it is preferable that the size be an odd number of bits in order that encryption and decryption without specialized hardware be difficult.

In one preferred embodiment of RExpansion 2210, RExpansion 2210 preferably replicates a predefined set of 25 input bits in order to produce an 89 bit intermediate value. The 89 bit intermediate value is sent to CombKey 2220 for combining with the round key 2230. It is appreciated that in some preferred implementations of RExpansion 2210, the predefined set may be unique per round. In another preferred embodiment of RExpansion 2210, RExpansion 2210 preferably performs an expanding linear transformation on R by performing an exclusive-OR (XOR) on a predefined set of input bits. In yet another preferred embodiment of RExpansion 2210, RExpansion 2210 preferably replicates a predefined set of 25 input bits and permutes, with a XOR, the predefined set of 25 input bits.

In still another preferred embodiment of RExpansion 2210, RExpansion 2210 preferably comprises a sparse linear transformation, such that each output bit is the result of a XOR of two input bits, and each input bit affects one or two output bits.

Preferably, there are a plurality of instances of RExpansion 2210, such that different instances of RExpansion 2210 can be used in different rounds.

CombKey 2220 preferably performs an operation which combines the 89 bit intermediate value with the round key 2230. Any appropriate reversible operation may be used. In some preferred implementations of the present invention, the size of the round key 2230 is preferably identical to the size of the output of RExpansion 2210, and the combining operation preferably comprises a bitwise XOR. In other preferred implementations the combining operation preferably comprises one of addition and subtraction modulo some constant. CombKey 2220 preferably outputs a result which is preferably input into Reduce 2240.

Reduce 2240 preferably reduces the output of CombKey into a 64 bit result. The reduce function 2240 is preferably designed in such a fashion that the reduce function 2240 is difficult to efficiently implement without specialized hardware, and easy to implement in specialized hardware. The reduce function 2240 preferably comprises a plurality of AND, OR, and NOT gates, arranged in a plurality of layers. After each one of the plurality of layers of gates, a resulting set of bits are preferably permuted and input into a next layer of the plurality of layers of gates.

Furthermore, each output bit is preferably close to balanced. Specifically, the probability that any output bit has a value of 1 is approximately one half, given a uniform distribution of input bits. It is preferable that each output bit is close to balanced even when a small subset of input bits comprise fixed values.

Additionally, each output bit function preferably does not comprise linear approximations. Specifically, for every linear operator L and for each output bit, the probability that a given output bit is identical to the result of applying the operator L on a corresponding input bit, assuming uniform distribution of the input bits, is preferably close to one half.

Preferably, there are a plurality of instances of the reduce function 2240, such that different instances of the reduce function 2240 can be used in different rounds.

It is appreciated that in some preferred implementations of the reduce function 2240, the reduce function 2240 can be one of:
 identical for all rounds;
 unique for all rounds;
 selected differently for even and odd rounds; and
 any other appropriate combination of instances of the reduce function 2240.

The reduce function 2240 is preferably implemented comprising 20-50 layers of small functions, each of the small functions serving as building blocks from which the reduce function 2240 is constructed. Each of the small functions preferably employs a balanced function, BF, and a non-linear function, NLF. At a first stage, NLF is preferably executed on at least one of the bits, thereby producing an output, Q. After executing NLF, BF is preferably executed on Q and at least a second input bit.

Non-limiting examples of appropriate small functions processing 3-bit inputs which are appropriate building blocks used in implementations of the reduce function 2240 include:
 (input1 OR input2)$\oplus$input3; and
 NOT((input1 AND input2)$\oplus$input3).

Implementations of the reduce function 2240 in a second layer preferably takes, as inputs, outputs of the reduce function 2240 in a first layer. It is preferable that a selection of which output of the first layer is input to which reduce function 2240 in the second layer is performed in such a way as to maximize mixing between layers.

In certain preferred implementations of the MixKey 2110, a pool of from 4 to 6 reduce functions 2240 are preferably available. The 4 to 6 reduce functions 2240 are used in a predetermined order, such that in each round only one of the reduce functions 2240 of the pool is used. For instance, and without limiting the generality of the foregoing, if there are 20 rounds and if there are 4 reduce functions 2240, designated as A, B, C, D, reduce function 2240 A may be used during rounds 1-5, reduce function B may be used during rounds 5-10, and so forth. Alternatively reduce function 2240 A may be used during rounds 1, 6, 11, and 16; reduce function 2240 B may be used during rounds 2, 7, 12, and 17; reduce function 2240 C may be used during rounds 3, 8, 13, and 18; reduce function 2240 D may be used during rounds 4, 9, 14, and 19; and reduce function 2240 E may be used during rounds 5, 10, 15, and 20. It is appreciated that any other suitable arrangement of the 4 to 6 reduce functions 2240 is acceptable.

Reference is now made to FIG. C-4, which is a simplified block diagram of the CombParts function 2120 of the system of FIG. C-1. The CombParts function 2120 preferably combines the 64 bit result of MixKey 2110 with the 64 bit unchanged L, thereby producing a new pseudo-random 64 bit R.

CombParts 2120 is preferably implemented such that:

CombParts 2120 is invertible for a second parameter with respect to a fixed first parameter. Namely, there should be a function ICombParts (inverted CombParts) such that for every X and Y: ICombParts(X, CombParts(X, Y))=Y; and CombParts should not be an involution; that is, ICombParts preferably differs significantly from CombParts. Specifically, a function such as XOR (such as is implemented in DES) would be unacceptable.

Several preferred implementations of functions which are both invertible for a second parameter with respect to a fixed first parameter and are not an involution are discussed below.

The bit result of MixKey 2110 is preferably input into a splitter 2310. Similarly, the 64 bit unchanged L is input into a splitter 2315. Splitter 2310 and splitter 2315 preferably divide their respective inputs into small sub-blocks, preferably of 2 to 4 bits each in size. In some preferred implementations of the present invention, splitter 2310 preferably divides the 64 bit result of MixKey 2110 into 16 4-bit sub-blocks, and splitter 2315 preferably divides the 64 bit unchanged L into 16 4-bit sub-blocks.

Each sub-block from splitter 2310 and corresponding sub-block from splitter 2315 is preferably input to one of a plurality of SubComb functions 2320. It is appreciated that in some preferred implementations of the present invention, there are 16 SubComb 2320 functions, in other preferred implementations of the present invention, there are 32 SubComb 2320 functions, and in still other preferred implementations of the present invention, there are some other number of SubComb 2320 functions.

SubComb 2320 is preferably implemented such that:

For every first input, SubComb 2320 is preferably reversible with respect to a second input; and The distribution of the effect of the input bits from splitter 2315 is preferably maximized in the output to Join function 2330.

Each of the input bits affects a maximal number of output bits. Namely when selecting a random bit; taking a subset of input bits that includes all of the input bits except for the selected bit; selecting random values; and fixing the bits in the subset to the selected random values, the probability that the result of calculating SubComb 2320 for the input bits with the selected bit as '1' is equal to the probability that the result of calculating SubComb 2320 for the input bits with the selected bit as '0', and is close to one half.

In the following discussion of several preferred implementations of SubComb 2320, it is assumed that SubComb 2320 receives two k-bit inputs and one k-bit output. Input bits from MixKey 2110 are referred to hereinafter as data bits, and input bits from L are referred to as control bits. k is preferably a small integer between 2 and 8.

One preferred implementation of SubComb 2320 comprises arithmetically adding a number whose binary representation corresponds to the data bits $2^k$ to a number whose binary representation corresponds to the control bits. It is appreciated that performing the above described arithmetic operation for small k can be efficiently implemented in specialized hardware.

It is appreciated that an inverse function of SubComb 2320 comprises a result of arithmetic subtraction of a number whose binary representation corresponds to the control bits from the number whose binary representation corresponds to the data bits.

A second preferred implementation of SubComb 2320 preferably performs a linear transformation on input bits from MixKey 2110 and input bits from L, generating a 4 bit temporal result. The 4 bit temporal result is then preferably input into a 4-bit-to-4-bit S-box (S-boxes are well known cryptographic structures. See, for example, FIPS 46-3.)

A third preferred implementation of SubComb 2320, comprises the following function:

1. For the first input B1=b11, b12 and for the second input B2=b21, b22, temp=b21, b22.

2. If b11=1, then shift temp by one location, such that temp=b22,b21.

3. If b12=1, then apply a bitwise negation (a "NOT" gate) on temp.

4. Output temp.

It is appreciated that in some preferred embodiments of the present invention, the second and third preferred implementations of SubComb 2320 are both implemented.

A fourth preferred implementation of SubComb 2320, more appropriate for larger inputs to the SubComb function, for instance, when the inputs are two 4-16 bit vectors, comprises defining a mapping of control input to a domain of invertible linear transformations. For example and without limiting the generality of the foregoing, the mapping may comprise starting with the identity transformation and replacing certain locations with control bits. It appreciated that when the replaced locations are selected over the primary diagonal, the linear transformation remains invertible. For example, for L(B11, B12, B13, B14), use:

$$\begin{bmatrix} 1 & B11 & 0 & B14 \\ 0 & 1 & B12 & 0 \\ 0 & 0 & 1 & B13 \\ 0 & 0 & 0 & 1 \end{bmatrix}$$

It is appreciated that the output of SubComb 2320 will therefore be an application of the resultant transformation on the second input.

The Join function 2330 is preferably implemented as a concatenation of the output of the plurality of SubComb functions 2320.

In some preferred embodiment of the present invention, in order to avoid any localization effects which may be induced either by S-boxes, by linear transformation, or by arithmetic addition, output from CombParts 2120 goes through a bitwise permutation (P-box 2130 (FIG. C-1)).

It is appreciated that CombParts 2120 makes encryption by the Feistel-like structure 2100 different from decryption by the Feistel-like structure 2100. Thus, for example and without limiting the generality of the foregoing, a decryptor in a consumer device cannot reencrypt decrypted content.

It is appreciated that software components of the present invention may, if desired, be implemented in ROM (read only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

What is claimed is:

1. A method of encrypting data, the method comprising:
combining a control input derived from a right part of a Feistel-like structure with a transformation input comprising a left part of the Feistel-like structure;
splitting, at a control input splitter, the control input, into a plurality of control input sub-blocks;
splitting, at a transformation input splitter, the transformation input, into a plurality of transformation input sub-blocks;
linearly combining each one of the plurality of control input sub-blocks with a corresponding one of the plurality of transformation input sub-blocks;
joining a plurality of results of the linear combining with each other at an output joiner; and
outputting a result of the joining,
wherein:
no bit of the output result comprises a linear combination of bits from the control input and bits from the transformation input;
the linearly combining comprises $(A(C) \times I) \oplus C$, where C represents the control input sub-block, I represents the transformation input sub-block, and $A(C)$ comprises a matrix depending on C, of size m×m, where m is a size of the control input sub-block, and $A(C) \times I$ represents matrix multiplication of $A(C)$ and I; and $$A(C) = \begin{bmatrix} 1 & C[0] & 0 & 0 \\ 0 & 1 & C[1] & 0 \\ 0 & 0 & 1 & C[2] \\ 0 & 0 & 0 & 1 \end{bmatrix} \times \begin{bmatrix} 1 & 0 & 0 & 0 \\ C[1] & 1 & 0 & 0 \\ 0 & C[2] & 1 & 0 \\ 0 & 0 & C[3] & 1 \end{bmatrix}$$

where C[0 . . . 3] comprise bits comprised in the control input.

2. A method of encrypting data, the method comprising:
receiving an input comprising a block of data expressed as a block of bits;
expanding the block of data from a first bit size to a second bit size;
combining the block of data of the second bit size with data derived from an encryption key and producing a first output;
mixing the first output at a mix and condensing unit, the mixing comprising key-independent mixing;
condensing, at the mix and condensing unit, the mixed first output to the first bit size, the condensing comprising key-independent condensing, thereby producing a control input of the first bit size;
combining the control input with a transformation input; and
producing an output,
wherein the mix and condensing unit comprises a plurality of mixing and condensing layers and the output comprises a combination of bits comprised in the control input and bits comprised in the transformation input, the output comprising the encrypted data, and
the combining the control input with a transformation input comprises:
splitting, at a control input splitter, the control input, into a plurality of control input sub-blocks;
splitting, at a transformation input splitter, the transformation input, into a plurality of transformation input sub-blocks;
linearly combining each one of the plurality of control input sub-blocks with a corresponding one of the plurality of transformation input sub-blocks, the linearly combining comprising linearly transforming; and
joining the result of the linear combining at an output joiner,
wherein no bit of the combination of bits comprises a linear combination of bits from the control input and bits from the transformation input and the linearly combining comprises $(A(C) \times I) \oplus C$, where C represents the control input sub-block, I represents the transformation input sub-block and $A(C)$ comprises a matrix depending on C, of size m×m, where m is a size of the control input sub-block, and $A(C) \times I$ represents matrix multiplication of $A(C)$ and I; and $$A(C) = \begin{bmatrix} 1 & C[0] & 0 & 0 \\ 0 & 1 & C[1] & 0 \\ 0 & 0 & 1 & C[2] \\ 0 & 0 & 0 & 1 \end{bmatrix} \times \begin{bmatrix} 1 & 0 & 0 & 0 \\ C[1] & 1 & 0 & 0 \\ 0 & C[2] & 1 & 0 \\ 0 & 0 & C[3] & 1 \end{bmatrix}$$

where C[0 . . . 3] comprise bits comprised in the control input.

3. The method according to claim 2 and wherein the producing comprises producing an output comprising a combination of bits comprised in the control input and bits comprised in the transformation input.

4. The method according to claim 2 and wherein the plurality of mixing and condensing layers comprises between 20 and 50 layers.

5. The method according to claim 2 and wherein the layers comprise a plurality of mini-functions, each mini-function comprising a non-linear and substantially balanced function.

6. The method according to claim 5, and wherein each mini-function receives at least 3 input bits and outputs at least 1 output bit.

7. The method according to claim 2 and wherein the input comprises a right part of a Feistel-like structure.

8. The method according to claim 2 and wherein the second bit size is larger than the first bit size.

9. The method according to claim 2 and wherein the data derived from an encryption key comprises a round key.

10. The method according to claim 2 and wherein each layer of the plurality of mixing and condensing layers comprises a mini-function layer comprising two micro-functions:
one balanced micro-function; and
one non-linear micro-function.

11. The method according to claim 10 and wherein the mini-function layer is operative to perform:
receiving an input;
splitting the input, at a splitter, into a block of balancing bits and a block of remaining input bits;
executing the method of the non-linear micro-function on the block of remaining input bits;
inputting the result of the non-linear micro-function into the balanced micro-function;
executing the method of the balanced micro-function on the result of the non-linear micro-function and the block of balancing bits; and
outputting a result.

12. The method according to claim 11 and further comprising performing an invertible transformation on the block of balancing bits prior to the executing the method of the balanced micro-function.

13. The method according to claim 12 and Wherein the invertible transformation comprises an S-box.

14. The method according to claim 13 and wherein the S-box comprises a 2 bit-to-2 bit S-box.

15. The method according to claim 10 and further comprising:
providing a first function $F_i$ and a second function $F_j$;
providing a round key generation function, the round key generation function being operative to utilize, in any given round, exactly one of:
the first function $F_i$; and
the second function $F_j$;
providing a round mixing function, the round mixing function being operative to utilize, in any given round, exactly one of:
the first function $F_i$; and
the second function $F_j$;
utilizing the round key generation function in at least a first round to generate a second round key for use in a second round; and
utilizing the round mixing function in at least the first round to mix a first round key with a cipher state,
wherein one of the following is performed in the first round:
the round key generation function utilizes the first function $F_i$ to generate the second round key for use in the second round, substantially simultaneously with the round key mixing function utilizing the second function $F_j$ to mix the first round key with the cipher state; and
the round key generation function utilizes the second function $F_j$ to generate the second round key for use in the second round, substantially simultaneously with the round key mixing function utilizing the first function $F_i$ to mix the first round key with the cipher state.

16. The method according to claim 2 and wherein the transformation input comprises a left part of the Feistel-like structure.

17. The method according to claim 2 and wherein the plurality of mix and condensing layers comprises at least 5 layers.

18. A data encryption apparatus comprising:
a combiner operative to combine a control input derived from a right part of a Feistel-like structure with a transformation input comprising a left part of the Feistel-like structure;
a control input splitter operative to split the control input into a plurality of control input sub-blocks;
a transformation input splitter operative to split the transformation input into a plurality of transformation input sub-blocks;
a linear combiner operative to linearly combine each one of the plurality of control input sub-blocks with a corresponding one of the plurality of transformation input sub-blocks;
an output joiner operative to join a plurality of results of the linear combining with each other; and
an outputter operative to output a result of the output joiner, wherein:
no bit of the output result comprises a linear combination of bits from the control input and bits from the transformation input; and
the linearly combining comprises $(A(C) \times I) \oplus C$, where C represents the control input sub-block, I represents the transformation input sub-block, and $A(C)$ comprises a matrix depending on C, of size m×m, where m is a size of the control input sub-block, and $A(C) \times I$ represents matrix multiplication of $A(C)$ and I; and $$A(C) = \begin{bmatrix} 1 & C[0] & 0 & 0 \\ 0 & 1 & C[1] & 0 \\ 0 & 0 & 1 & C[2] \\ 0 & 0 & 0 & 1 \end{bmatrix} \times \begin{bmatrix} 1 & 0 & 0 & 0 \\ C[1] & 1 & 0 & 0 \\ 0 & C[2] & 1 & 0 \\ 0 & 0 & C[3] & 1 \end{bmatrix}$$

where C[0 . . . 3] comprise bits comprised in the control input.

19. A data encryption apparatus comprising:
an input receiver operative to receive a block of data expressed as a block of bits;
an expander operative to expand the block of data from a first bit size to a second bit size;
a combiner operative to combine the block of data of the second bit size with data derived from an encryption key thereby producing a first output;
a mix and condensing unit operative to mix the first output, the mixing comprising key-independent mixing;
the mix and condensing unit being further operative to condense the mixed first output to the first bit size, the condensing comprising key-independent condensing, thereby producing a control input of the first bit size;
a combiner operative to combine the control input with a transformation input; and
a producer operative to produce an output,
wherein the mix and condensing unit comprises a plurality of mixing and condensing layers and the output comprises a combination of bits comprised in the control input and bits comprised in the transformation input, the output comprising the encrypted data, and the combiner comprises:
a control input splitter operative to split the control input into a plurality of control input sub-blocks;
a transformation input splitter operative to split the transformation input into a plurality of transformation input sub-blocks;
a linear combiner operative to linearly combining each one of the plurality of control input sub-blocks with a corresponding one of the plurality of transformation input sub-blocks, the linearly combining comprising linearly transforming; and
a joiner operative to join the result of the linear combining at an output joiner, wherein no bit of the combination of bits comprises a linear combination of bits from the control input and bits from the transformation input and the linearly combining comprises $(A(C) \times I) \oplus C$, where C represents the control input sub-block, I represents the transformation input sub-block and A(C) comprises a matrix depending on C, of size m×m, where m is a size of the control input sub-block, and $A(C) \times I$ represents matrix multiplication of A(C) and I; and $$A(C) = \begin{bmatrix} 1 & C[0] & 0 & 0 \\ 0 & 1 & C[1] & 0 \\ 0 & 0 & 1 & C[2] \\ 0 & 0 & 0 & 1 \end{bmatrix} \times \begin{bmatrix} 1 & 0 & 0 & 0 \\ C[1] & 1 & 0 & 0 \\ 0 & C[2] & 1 & 0 \\ 0 & 0 & C[3] & 1 \end{bmatrix}$$

where C[0 . . . 3] comprise bits comprised in the control input.

20. The apparatus according to claim 19 and wherein the producer produces an output comprising a combination of bits comprised in the control input and bits comprised in the transformation input.

\* \* \* \* \*

UNITED STATES PATENT AND TRADEMARK OFFICE
CERTIFICATE OF CORRECTION

PATENT NO. : 8,437,470 B2
APPLICATION NO. : 11/992983
DATED : May 7, 2013
INVENTOR(S) : Mantin et al.

It is certified that error appears in the above-identified patent and that said Letters Patent is hereby corrected as shown below:

In the Specifications:

In column 20, line 58, delete "n+11" and substitute therfor --n+1--;

In column 21, line 1, delete "or $F_bF_j$" and substitute therefor --or $F_b = F_j$--;

In column 30, line 66, delete "P-boxPR$_1$" and substitute therefor --P-boxPR$_i$--;

In the Claims:

In column 37, line 26 (first line of claim 13), delete "Wherein" and substitute therefor --wherein--.

Signed and Sealed this
Twenty-third Day of July, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,437,470 B2 | Page 1 of 1 |
| APPLICATION NO. | : 11/992983 | |
| DATED | : May 7, 2013 | |
| INVENTOR(S) | : Mantin et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1467 days.

Signed and Sealed this
Fourth Day of November, 2014

Michelle K. Lee
*Deputy Director of the United States Patent and Trademark Office*

UNITED STATES PATENT AND TRADEMARK OFFICE
CERTIFICATE OF CORRECTION

| | |
|---|---|
| PATENT NO. | : 8,437,470 B2 |
| APPLICATION NO. | : 11/992983 |
| DATED | : May 7, 2013 |
| INVENTOR(S) | : Mantin et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1467 days.

Signed and Sealed this
Twenty-sixth Day of May, 2015

Michelle K. Lee
*Director of the United States Patent and Trademark Office*